US010813136B2

(12) United States Patent
Yerramalli et al.

(10) Patent No.: US 10,813,136 B2
(45) Date of Patent: Oct. 20, 2020

(54) DUAL CONNECTIVITY WITH A NETWORK THAT UTILIZES AN UNLICENSED FREQUENCY SPECTRUM

(71) Applicant: QUALCOMM Incorporated, San Diego, CA (US)

(72) Inventors: Srinivas Yerramalli, San Diego, CA (US); Ozcan Ozturk, San Diego, CA (US); Peter Gaal, San Diego, CA (US); Tamer Kadous, San Diego, CA (US); Yongbin Wei, La Jolla, CA (US)

(73) Assignee: Qualcomm Incorporated, San Diego, CA (US)

( * ) Notice: Subject to any disclaimer, the term of this patent is extended or adjusted under 35 U.S.C. 154(b) by 146 days.

(21) Appl. No.: 16/116,855

(22) Filed: Aug. 29, 2018

(65) Prior Publication Data

US 2019/0069325 A1 Feb. 28, 2019

Related U.S. Application Data

(60) Provisional application No. 62/552,179, filed on Aug. 30, 2017.

(51) Int. Cl.
*H04W 76/27* (2018.01)
*H04W 52/38* (2009.01)
(Continued)

(52) U.S. Cl.
CPC ........... *H04W 74/0833* (2013.01); *H04L 5/00* (2013.01); *H04W 52/346* (2013.01);
(Continued)

(58) Field of Classification Search
None
See application file for complete search history.

(56) References Cited

U.S. PATENT DOCUMENTS 10,165,592 B2 * 12/2018 Dinan ................... H04L 5/0053
10,367,677 B2 * 7/2019 Parkvall ............... H04B 7/0617
(Continued)

OTHER PUBLICATIONS

International Search Report and Written Opinion—PCT/US2018/048837—ISA/EPO—dated Nov. 15, 2018.
(Continued)

*Primary Examiner* — Sithu Ko
*Assistant Examiner* — Emmanuel K Maglo
(74) *Attorney, Agent, or Firm* — Arent Fox, LLP

(57) ABSTRACT

Aspects presented herein provide for dual connectivity with a standalone service provider in the unlicensed spectrum. A first base station may receive, from a UE, an indication of a capability for standalone operation in a first RAT that utilizes an unlicensed frequency spectrum and a dual connectivity capability involving the first RAT and a second RAT that utilizes a licensed frequency spectrum, wherein dual connectivity comprises the UE being connected to a master base station on a first frequency and a secondary base station on a second frequency at a same time. The first base station may signal a first set of procedures for dual connectivity when the level of support at the first base station is at higher layers of the first RAT and may signal a second set of procedures when the level of support at the first base station extends to lower layers of the first RAT.

26 Claims, 18 Drawing Sheets

(51) Int. Cl.

| | |
|---|---|
| *H04W 74/08* | (2009.01) |
| *H04W 72/04* | (2009.01) |
| *H04W 52/36* | (2009.01) |
| *H04W 52/34* | (2009.01) |
| *H04L 5/00* | (2006.01) |
| H04W 84/04 | (2009.01) |
| H04W 88/06 | (2009.01) |
| H04W 88/08 | (2009.01) |
| H04W 16/14 | (2009.01) |
| H04W 8/24 | (2009.01) |
| H04W 76/15 | (2018.01) |

(52) U.S. Cl.
CPC ......... *H04W 52/365* (2013.01); *H04W 52/38* (2013.01); *H04W 72/04* (2013.01); *H04W 76/27* (2018.02); *H04W 8/24* (2013.01); *H04W 16/14* (2013.01); *H04W 76/15* (2018.02); *H04W 84/042* (2013.01); *H04W 88/06* (2013.01); *H04W 88/08* (2013.01)

(56) References Cited

U.S. PATENT DOCUMENTS

| | | | | |
|---|---|---|---|---|
| 2012/0159279 | A1* | 6/2012 | Braithwaite | H04B 7/2606 714/751 |
| 2012/0231784 | A1* | 9/2012 | Kazmi | H04W 36/0072 455/423 |
| 2015/0131578 | A1* | 5/2015 | Baek | H04W 72/0406 370/329 |
| 2015/0148050 | A1* | 5/2015 | Siomina | H04J 11/005 455/452.1 |
| 2016/0219569 | A1* | 7/2016 | Kuo | H04W 74/0833 |
| 2016/0262149 | A1* | 9/2016 | Futaki | H04L 5/001 |
| 2017/0013565 | A1* | 1/2017 | Pelletier | H04W 52/146 |
| 2017/0111874 | A1* | 4/2017 | Harada | H04L 5/001 |
| 2017/0201998 | A1 | 7/2017 | Akiyama et al. | |
| 2017/0310433 | A1* | 10/2017 | Dinan | H04W 74/08 |
| 2017/0331670 | A1* | 11/2017 | Parkvall | H04J 11/0056 |
| 2018/0042048 | A1* | 2/2018 | Hugl | H04W 74/0808 |
| 2018/0092118 | A1* | 3/2018 | Kim | H04W 72/1278 |
| 2018/0115928 | A1* | 4/2018 | Kim | H04W 36/0033 |
| 2018/0160271 | A1* | 6/2018 | Vutukuri | H04W 12/06 |
| 2018/0184475 | A1* | 6/2018 | Babaei | H04L 27/0006 |
| 2018/0199315 | A1* | 7/2018 | Hong | H04W 88/10 |
| 2018/0255576 | A1* | 9/2018 | Bhorkar | H04L 27/0006 |
| 2018/0279176 | A1* | 9/2018 | Legg | H04W 28/10 |
| 2018/0324624 | A1* | 11/2018 | Gu | H04W 36/0088 |
| 2018/0343697 | A1* | 11/2018 | Hsu | H04W 76/27 |
| 2019/0021105 | A1* | 1/2019 | Hamidi-Sepehr | H04W 72/1268 |
| 2019/0044598 | A1* | 2/2019 | Talarico | H04L 27/0006 |
| 2019/0052308 | A1* | 2/2019 | Niu | H04B 1/7143 |
| 2019/0089498 | A1* | 3/2019 | Pelletier | H04L 5/003 |
| 2019/0098661 | A1* | 3/2019 | Ye | H04W 74/06 |
| 2019/0104503 | A1* | 4/2019 | Niu | H04L 5/0048 |
| 2019/0132860 | A1* | 5/2019 | Bhorkar | H04W 72/1284 |
| 2019/0132896 | A1* | 5/2019 | Kusashima | H04W 76/15 |
| 2019/0159229 | A1* | 5/2019 | Yi | H04L 5/001 |
| 2020/0014495 | A1* | 1/2020 | Niu | H04L 1/1822 |

OTHER PUBLICATIONS

Qualcomm Incorporated: "Capability Coordination across RATs", 3GPP Draft; R2-165644 Capability Coordination Across Rats, 3rd Generation Partnership Project (3GPP), Mobile Competence Centre; 650, Route Des Lucioles ; F-06921 Sophia-Antipolis Cedex; France, vol. RAN WG2, No. Gothenburg; Aug. 22, 2016-Aug. 26, 2016, Aug. 21, 2016 (Aug. 21, 2016), XP051127059, 6 Pages, Retrieved from the Internet: URL:http://www.3gpp.org/ftp/Meetings_3GPP_SYNC/RAN2/Docs/ [retrieved on Aug. 21, 2016].

ZTE Corporation: "Consideration on the Temporary Capability Restriction", 3GPP Draft, R2-1708153 Consideration on the Temporary Capability Restriction, 3rd Generation Partnership Project (3GPP), Mobile Competence Centre, 650, Route Des Lucioles, F-06921 Sophia-Antipolis C, vol. RAN WG2, No. Berlin, Germany, Aug. 21, 2017-Aug. 25, 2017, Aug. 20, 2017 (Aug. 20, 2017), XP051318056, pp. 1-4, Retrieved from the Internet: URL:http://www.3gpp.org/ftp/Meetings_3GPP SYNC/RAN2/Docs/[retrieved on Aug. 20, 2017].

* cited by examiner

DUAL CONNECTIVITY WITH A NETWORK THAT UTILIZES AN UNLICENSED FREQUENCY SPECTRUM

CROSS-REFERENCE TO RELATED APPLICATION

This application claims the benefit of U.S. Provisional Application Ser. No. 62/552,179, entitled "LTE-MF Dual Connectivity" and filed on Aug. 30, 2017, which is expressly incorporated by reference herein in its entirety.

BACKGROUND

Field

The present disclosure relates generally to communication systems, and more particularly, to dual connectivity involving a secondary standalone network that operates in the unlicensed spectrum.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. Another example telecommunication standard is 5G New Radio (NR). 5G NR is part of a continuous mobile broadband evolution promulgated by 3GPP to meet new requirements associated with latency, reliability, security, scalability (e.g., with Internet of Things (IoT)), and other requirements. Some aspects of 5G NR may be based on the 4G LTE standard. However, as the demand for mobile broadband access continues to increase, there exists a need for further improvements in LTE and NR technology. These improvements may also be applicable to other multi-access technologies and the telecommunication standards that employ these technologies.

Dual connectivity may provide a number of benefits. For example, dual connectivity may reduce a load on a master base station by having a Secondary eNB (SeNB) provide additional radio resources to those obtained from a Master eNB (MeNB). However, dual connectivity is designed with the assumption that both an MeNB and an SeNB belong to the same operator and are part of the same network. This limits dual connectivity and creates challenges in some scenarios where the MeNB and the SeNB may belong to different operators/networks.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Dual connectivity is designed with the assumption that both an MeNB and an SeNB belong to the same operator and are part of the same network. For example, 3GPP supports dual connectivity between an LTE network and a home eNB, both being part of the same network. Such dual connectivity has been based on MeNB anchored communication, e.g., relying on an MeNB for connection setup and high level control of the network while the SeNB provides additional radio resources. The SeNB may be deployed in a licensed spectrum or an unlicensed spectrum and is part of a single operator's network. Standalone networks operating in the unlicensed spectrum include functions for connection setup, downlink and uplink control information at the physical layer, data communications and other needed signaling entirely in the unlicensed spectrum.

MulteFire (MF) is one example of a standalone network operating in the unlicensed spectrum and with which dual connectivity operations described herein may be utilized. Dual connectivity with other LTE or NR based asynchronous service providers in the unlicensed spectrum may also be performed based on the aspects described herein. Dual connectivity involving standalone networks in the unlicensed spectrum may provide a number of benefits including deployment with base stations having non-ideal backhaul to a licensed cell, reduction in the registration of base stations that are tied to a licensed spectrum, and reduction of a load on a licensed cell layer that carries control signaling for LAA carriers. However, the asynchronous communication provided by standalone networks in the unlicensed spectrum, where the master base station and the secondary base station may belong to different operators, presents unique problems for implementing dual connectivity with a 5G NR, LTE, or other 3GPP base station.

The present disclosure contemplates dual-connectivity in which a standalone network operating in an unlicensed spectrum provides airlink resources as a secondary node and base station operating in a licensed spectrum, e.g., an LTE base station, operates as the master node.

Aspects presented herein provide a design for implementing dual connectivity involving standalone networks in the unlicensed spectrum, e.g., examples including LTE-MF dual connectivity, NR-MF dual connectivity, etc. For example, an master cell base station (also referred to generically as a "master node" or "MeNB") may provide an indication of a set of procedures for dual connectivity communication based on a level of its support for unlicensed first radio access technology that utilizes an unlicensed frequency spectrum. The master base station may signal a first set of procedures for dual connectivity when the level of support at the master node is limited to higher layers of the first radio access technology and may signal a second set of procedures for dual connectivity when the level of support at the master node extends to lower layers of the first radio access technology.

In an aspect of the disclosure, a method, a computer-readable medium, and an apparatus for wireless communication at a first base station are provided. The apparatus receives, from a user equipment, an indication of capability for standalone operation in a first Radio Access Technology (RAT) that utilizes an unlicensed frequency spectrum and dual connectivity capability involving the first RAT and a second RAT that utilizes a licensed frequency spectrum, wherein the dual connectivity comprises the user equipment being connected to a master base station on a first frequency and a secondary base station on a second frequency at a same time. The master base station or the secondary base station comprises a base station for the first RAT that utilizes the unlicensed frequency spectrum. The base station may operate on the unlicensed frequency (e.g., unlicensed spectrum) in a standalone manner. The apparatus signals, to the UE, an indication of a set of procedures for dual connectivity communication with the master base station and the secondary base station, wherein the set of procedures corresponds to a level of support for the first RAT at the first base station. The first base station may signal a first set of procedures for dual connectivity when the level of support at the master node is at higher layers of the first radio access technology and may signal a second set of procedures for dual connectivity when the level of support at the master node extends to lower layers of the first radio access technology.

In another aspect of the disclosure, a method, a computer-readable medium, and an apparatus for wireless communication at a user equipment (UE) are provided. The apparatus transmits, to a first base station using a first Radio Access Technology (RAT) in a licensed frequency spectrum, an indication of a capability for standalone operation in a second RAT that utilizes an unlicensed frequency spectrum and a dual connectivity capability involving the first RAT and the second RAT, wherein the dual connectivity comprises the user equipment being connected to the first base station as a master base station on a first frequency and a second base station using the second RAT as a secondary base station on a second frequency at a same time. The apparatus receives an indication from the first base station of a set of procedures for dual connectivity communication with the master base station and the secondary base station, wherein the set of procedures corresponds to a level of support for the second RAT at the first base station.

In another aspect of the disclosure, a method, a computer-readable medium, and an apparatus for wireless communication at first base station are provided. The first base station may operate on an unlicensed frequency (e.g., unlicensed spectrum) in a standalone manner using a first RAT. The apparatus receives, from a second base station, negotiation for dual connectivity communication with a user equipment, wherein the dual connectivity comprises the user equipment being connected to the second base station as a master base station on a licensed frequency spectrum and the first base station as a secondary base station on a second frequency at a same time. The apparatus receives an indication of a set of procedures for dual connectivity communication with the second base station as the master base station and the first base station as a secondary base station, wherein the set of procedures corresponds to a level of support for the first radio access technology at the second base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
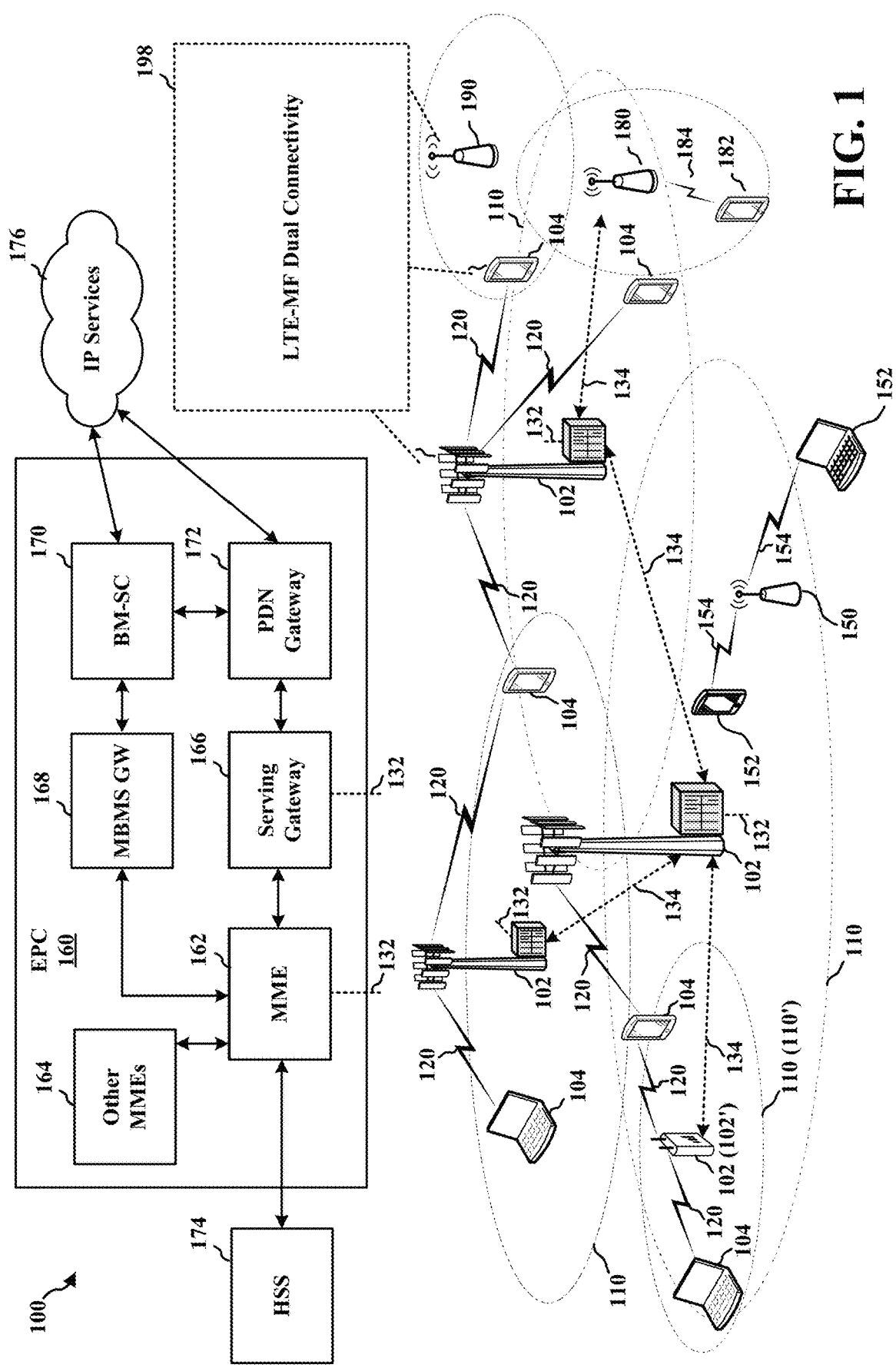
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE or NR and use the same 5 GHz unlicensed frequency spectrum as used by the Wi-Fi AP 150. The small cell 102', employing LTE/NR in an unlicensed frequency spectrum, may boost coverage to and/or increase capacity of the access network. LTE in an unlicensed spectrum may be referred to as LTE-unlicensed (LTE-U), licensed assisted access (LAA), or MulteFire (MF). For example, the wireless communications system may include a base station 190 that operates in an unlicensed spectrum in a standalone manner. An MF base station is one example of an unlicensed standalone base station.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The wireless communication system 100 may include communication 192 directly between UEs 104.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104, base station 102, 180, and base station 190 capable of standalone operation in a first RAT that utilizes an unlicensed frequency spectrum may be configured, as illustrated at 198, to perform aspects of dual connectivity involving the first RAT and a second RAT that utilizes a licensed frequency spectrum, as described in connection with FIGS. 5-11. Although illustrated with eNB 102, the dual connectivity may involve a 5G NR base station, an LTE base station, or another 3GPP base station. The base station 190 of the first RAT may operate as either the master base station or the secondary base station.

Figure 2A:
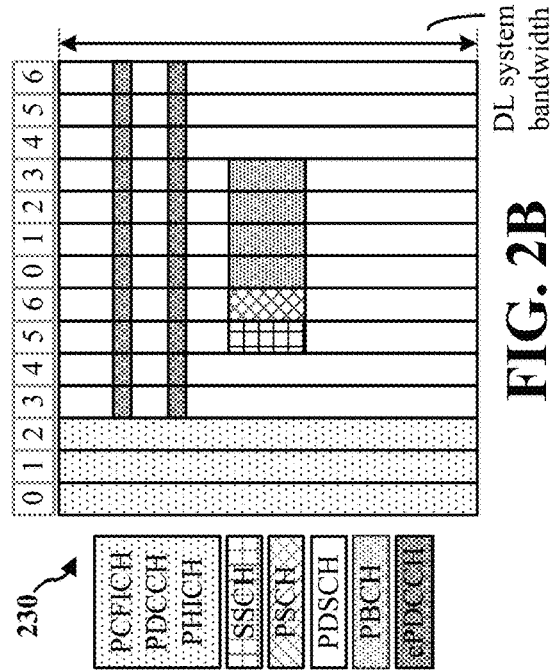
FIGS. 2A, 2B, 2C, and 2D are diagrams illustrating LTE examples of a DL frame structure, DL channels within the DL frame structure, an UL frame structure, and UL channels within the UL frame structure, respectively.
Figure 2B:
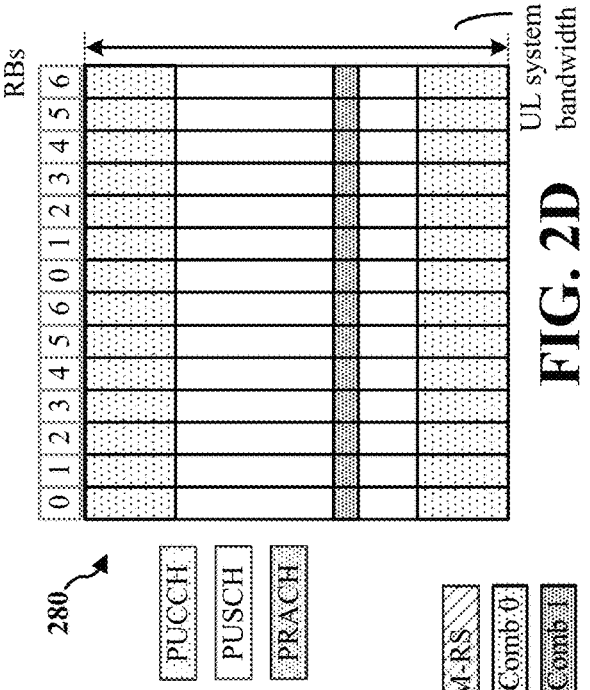
Figure 2C:
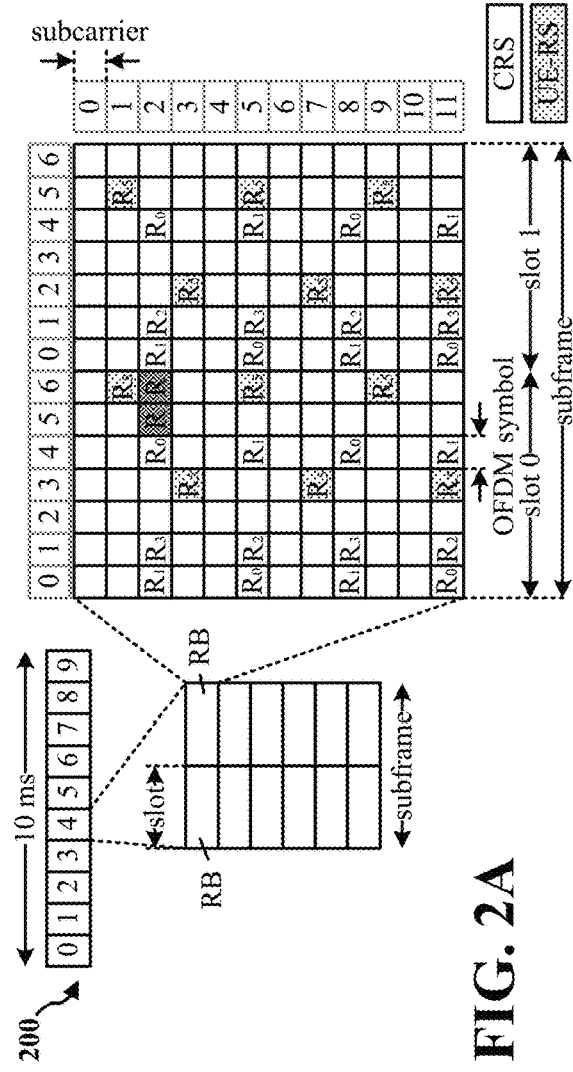
Figure 2D:
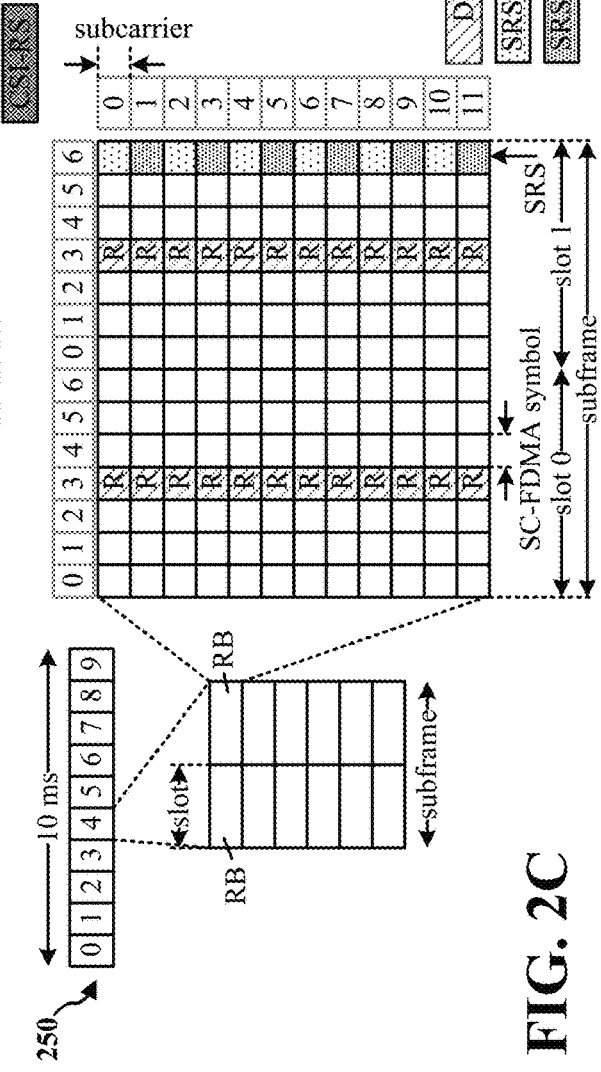

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
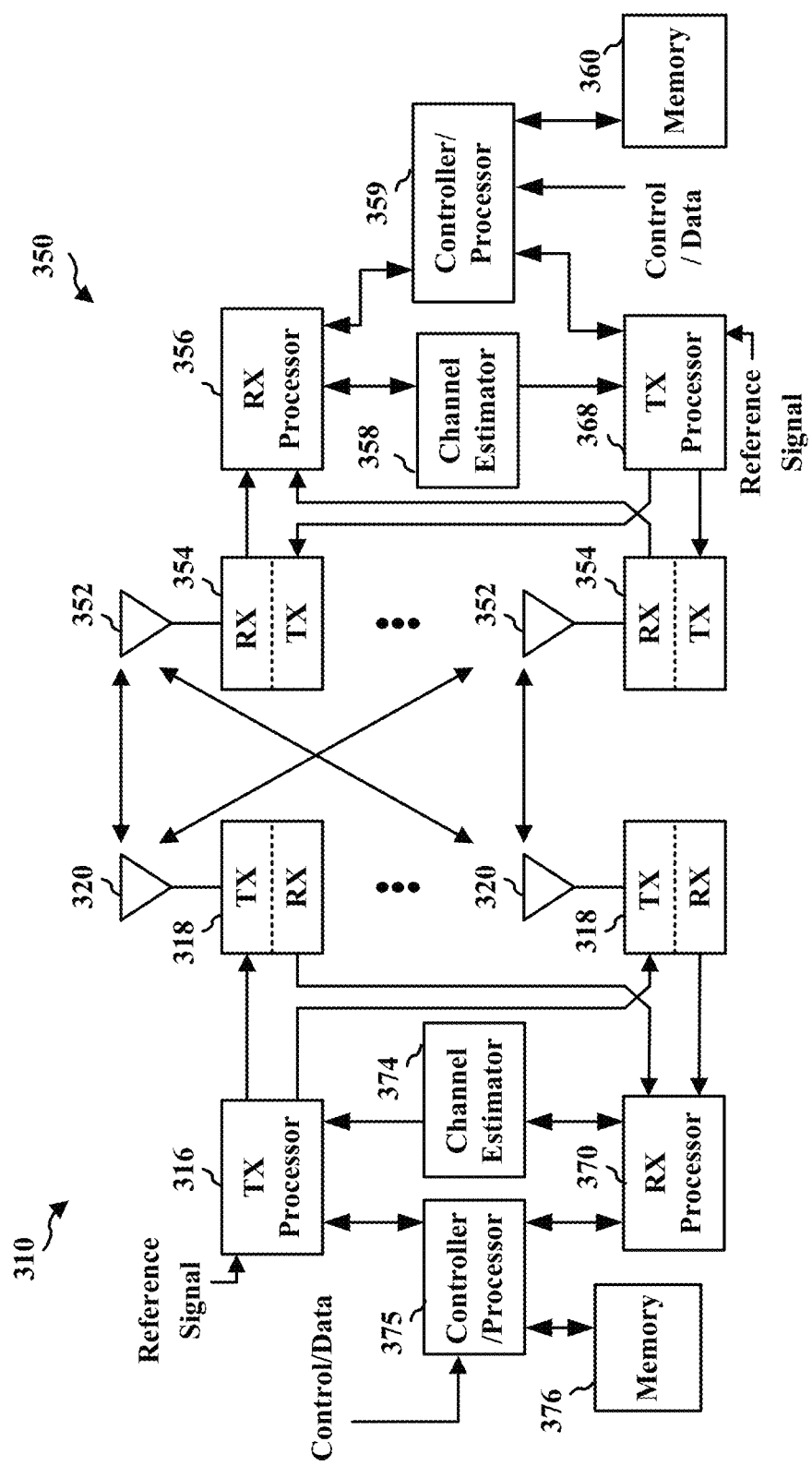
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4A:
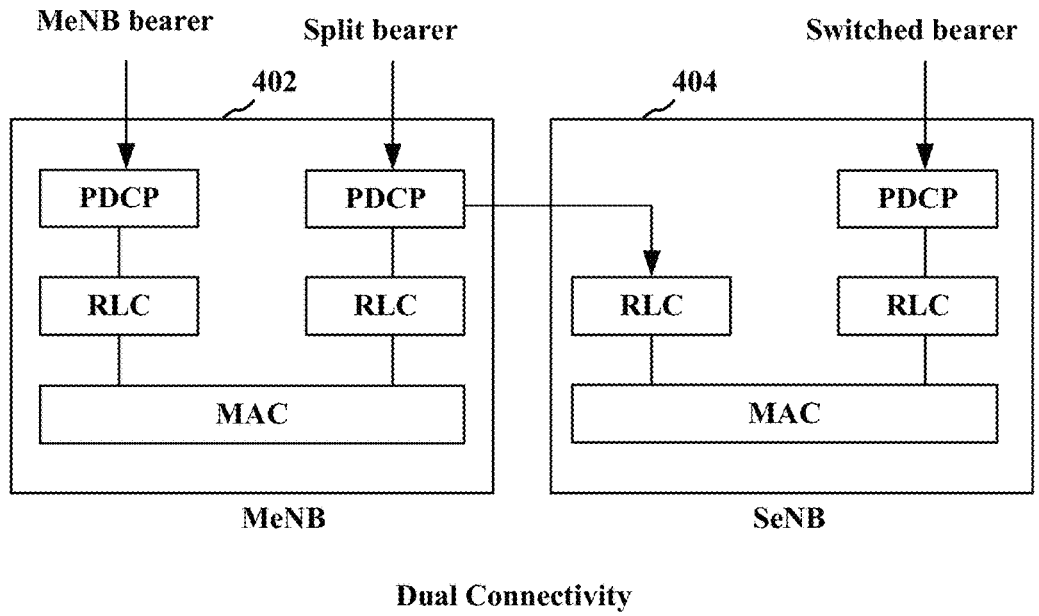
FIGS. 4A and 4B illustrate an example design for dual connectivity.

FIG. 4A illustrates a dual connectivity design in 3GPP. This design is made under the assumption that both a Master eNB (MeNB) 402 and a Secondary eNB (SeNB) 404 belong to the same operator and are part of the same network. 3GPP may support dual connectivity between an LTE network and a home eNB, both open and closed access, that can be shared by many Public Land Mobile Networks (PLMNs). Dual connectivity is designed with the assumption that both an MeNB and an SeNB belong to the same operator and are part of the same network. For example, 3GPP supports dual connectivity between an LTE network and a home eNB, both being part of the same network.

Such dual connectivity has been based on MeNB anchored communication, e.g., relying on an MeNB for connection setup and high level control of the network while the SeNB provides additional radio resources. The SeNB may be deployed in licensed or unlicensed spectrum and is part of a single operator's network. Standalone networks operating in the unlicensed spectrum include functions for connection setup, downlink and uplink control information at the physical layer, data communications and other needed signaling in the unlicensed spectrum.

In contrast to such MeNB anchored communication, standalone networks operating in the unlicensed spectrum may include communication (e.g., control, RACH, Ack/Nack, as well as data) to be communicated in the unlicensed spectrum. There may be a number of benefits to providing dual connectivity that enables asynchronous deployments in the unlicensed spectrum, where a master base station and a secondary base station may belong to different operators. MulteFire (MF) is one example of a standalone network operating in the unlicensed spectrum and with which dual connectivity operations described herein may be utilized. Dual connectivity with other LTE or NR based asynchronous service providers in the unlicensed spectrum may also be performed based on the aspects described herein. As a first example, deployments could be provided in homes, enterprises, etc. that have a non-ideal backhaul to a licensed cell. As well, the ability to provide dual connectivity in asynchronous deployments may avoid aspects of registering eNBs which are tied to a licensed spectrum. Additionally, such dual connectivity may avoid overloading the licensed cell layer which carries control signaling, such as with LAA carriers.

The present disclosure provide dual-connectivity in which standalone network operating in an unlicensed spectrum provides airlink resources as a secondary node and an base station operating in the licensed spectrum, e.g., an LTE eNB or 5G NR base station, operates as the master node.

Aspects presented herein provide for dual connectivity involving standalone service providers in the unlicensed spectrum and a core network. In one example, the core network may comprise an LTE network and the standalone service provider may comprise a MF service provider. In this example, the dual connectivity may be referred to as LTE-MF dual connectivity. This is merely one example for illustration purposes. Other examples may include dual connectivity of a service provider capable of standalone operation in the unlicensed spectrum and an 5G NR base station or a 3GPP base station. MF is one example, of a standalone network that utilizes an unlicensed spectrum. As well, the aspects presented herein may be applied to dual connectivity with other standalone service providers operating in the unlicensed spectrum. The base station operating in the unlicensed spectrum may operate as the master base station or as the secondary base station.

Figure 4B:
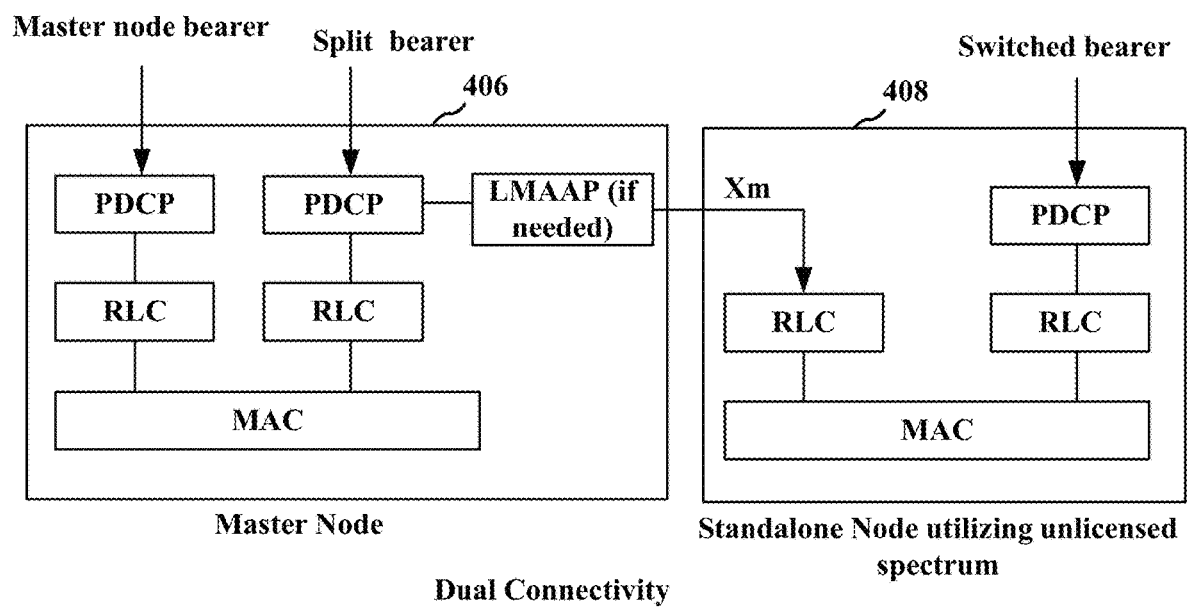

FIG. 4B illustrates a design for dual connectivity between a master node 406 (e.g., a MeNB or other master node) and a base station 408 capable of a standalone mode and that operates in an unlicensed spectrum as a secondary node (e.g., an SeNB). The master node may comprise an LTE base station, a 5G NR base station, or a 3GPP base station. Additionally, in another example, the node utilizing the unlicensed spectrum may operate as the master node while the LTE eNB, 5G base station, or 3GPP base station operates as the secondary node. In FIG. 4B, the coordination between base stations may need to occur at both the control plane and the user plane. For example, at the control plane, RRC configuration, mobility management/handover, serving gateway (S-GW) and PDN gateway (P-GW) management, etc. may need to be coordinated between the licensed base station and the base station utilizing the unlicensed spectrum. At the user plane, the transfer of PDCP packets to RLC and from RLC to PDCP may need to be coordinated.

The master node's network may have different levels of understanding of the operation of an standalone network in the unlicensed spectrum.

In a first example, using MF as an example of the network utilizing the unlicensed spectrum, the master node's network may understand that the MAC layers and upper layers of the MF network are similar to the master node's network, e.g., similar to LTE. In such cases, the master node network may be able to interwork with the upper layers of the MF node, e.g., up to PDCP/RRC, but might have limited knowledge of the workings of the physical layer and MAC layer of the MF node. The master node might also have no knowledge of the workings of the physical layer and MAC layer of the MF node.

In a second example, the master node may fully understand the upper layers and lower layers of radio network operation of the MF node.

Dual connectivity between the master node and the MF node may be different depending on the level of understanding that the master node has of the MF network. For example, procedures for physical layer operation and/or MAC layer operation in dual connectivity with a MF network may differ depending on a level of support for MF radio access technology at the master node, e.g., the level of knowledge that the master node has of the physical layer/MAC layer of the MF node. For example, there may be a first set of procedures for dual connectivity when the level of support at the master node is at higher layers of the MF radio access technology and there may be a second set of procedures for dual connectivity when the level of support at the master node extends to lower layers of the MF radio access technology.

The master node may indicate to the corresponding UE its level of support for the MF network in dual connectivity. For example, the master node may transmit an indication as to whether a level of support of the master node is at higher layers of the MF RAT or whether the level of support of the master node extends to lower layers of the MF RAT. The master node might also indicate different sets of procedures based on a corresponding level of support without indicating the actual level of knowledge of the MF RAT. Table 1 lists various aspects of communication that may differ depending on whether the master node has a full understanding of the physical (PHY) and MAC layers of the standalone unlicensed node or only has a partial knowledge, e.g., an understanding of upper layers. While MF is used in this explanation as an example of a network/node capable of standalone operation in a RAT that utilizes an unlicensed frequency spectrum, the concepts may be applied to other networks/nodes that are capable of standalone operation in a RAT that utilizes the unlicensed frequency spectrum.

Table 1 illustrates example aspects of dual connectivity between a first network that utilizes a licensed spectrum and a second network capable of standalone operation in a RAT that utilizes the unlicensed frequency spectrum.

TABLE 1

| Topic | Dual Connectivity with full PHY layer understanding | Dual Connectivity with upper layer understanding |
|---|---|---|
| Timing Sync | Synchronous/Asynchronous networks | Asynchronous assumption |
| SIBs/Paging | SIBs and paging on licensed network. SIBs can be understood by $1^{st}$ network | SIBs reading on $2^{nd}$ network or tunneled transparently. Paging on the $1^{st}$ network |
| UL Control Information | UCI transmission independently per CG | |
| A-CSI Computation Limit | Up to UE implementation to limit CSI computation | |
| Power Control | 1. Independent TPC per CG 2. Optimized power control mode 1 for sync networks | 1. Independent TPC per CG 2. Only async mode power control |
| Power Headroom Report | Joint PHR report for both CGs | Independent PHR reporting for each CG. Each CG does not understand the configuration of the other |
| Power Split between CGs | RRC configuration indicates split between master node & secondary node | RRC config as in LTE-DC (or) up to UE implementation (or) full power to both radios as in LWA (exceeds 23 dBm) |
| SPS and TTI bundling | Not supported on LAA and $2^{nd}$ network | |
| DRX and DRX interruptions | 1. Separate DRX configuration for each CG 2. DRX interruptions are not applicable if independent radios are used for LAA/$2^{nd}$ network | |
| Cross-carrier scheduling | Cross-carrier scheduling is not supported from LAA/carrier of the $2^{nd}$ network to another LAA/MF carrier | |
| Logical channel groups and BSR reporting | 1. Per CG configuration 2. For split bearers, BSR on configured CG | 1. Per CG configuration 2. For split bearers, BSR only on the $1^{st}$ network and $2^{nd}$ network separately. |
| Timing Alignment | Independent per CG. For sync network, licensed and LAA/$2^{nd}$ network cells can come under one TAG but it is not needed | |
| Timer configuration | Independent configuration per CG | |
| Measurement gaps | 1. May support per-CC measurement gaps or common gaps 2. Common measurement gap does not work due to floating LBT for LAA and $2^{nd}$ network | |
| RLM/RLF Measurement configuration | May be similar procedures as LTE-DC. Maintained by master node | |
| Additional radio resources | Master node may request LAA or $2^{nd}$ network secondary node to configure additional radio resources. Up to secondary node whether to accept or reject request. If accepted, secondary node sends configuration to master node to be sent to the UE | |
| Measurement results | For reports related to LAA/cells of the $2^{nd}$ network, master node can configure whether LAA/cells of the $2^{nd}$ network can be used to send measurement report. If sent on the LAA/cells of the $2^{nd}$ network, the measurement reports are forwarded to the master node | |
| Secondary CG configuration | 1. Master node adds/changes/deletes the LAA/2nd network Scells. No handover on LAA/2nd network 2. SCG modification failure indicated to master node | |
| Handover | May be similar aspects to LTE DC in high level procedures. Also see detailed description regarding cell search and SIB/random access | |
| Security | May be similar to LTE DC in high level procedures Can be done over X2 interface | |
| LTE master node and LAA/standalone unlicensed secondary node coordination | | |

As described in table 1, a power headroom report (PHR) may be different, depending on whether the master node has a full or a partial understanding of the PHY and MAC layers of another node that is capable of standalone operation in a RAT that utilizes the unlicensed frequency spectrum. When the master node has a full understanding of the PHY and MAC layers of the other node, joint power headroom reporting may be performed for both the master node and the other node. When the master node has an understanding of the only the upper layers of the other node, independent power headroom reporting may be performed for the master node and the other node, e.g., because each cell group (CG) does not understand the configuration of the other.

In another example, a power split between CGs may differ depending on whether the master node has a full or a partial understanding of the PHY and MAC layers of the other node. When the master node has a full understanding of the PHY and MAC layers of the other node, an RRC configuration may indicate a power split between the master node and the other node (e.g., secondary node). When the master node has an understanding of the only the upper layers of the other node, the RRC configuration might not include a power split between the master node and the other node, and may instead comprise one of multiple different configuration types. For example, the RRC configuration may depend on a UE implementation, or the RRC configuration may be full power for both radios (e.g., may exceed 23 dBm), etc.

In another example, logical channel groups and BSR reporting may differ depending on whether the master node has a full or a partial understanding of the PHY and MAC layers of the other node that is capable of standalone operation in a RAT that utilizes the unlicensed frequency spectrum. When the master node has a full understanding of the PHY and MAC layers of the other node, buffer status reporting may be based on split bearers between the master node and the other node. When the master node has an understanding of the only the upper layers of the other node, independent buffer status reporting may be performed for the master node and other node.

Cell Search

Figure 5:
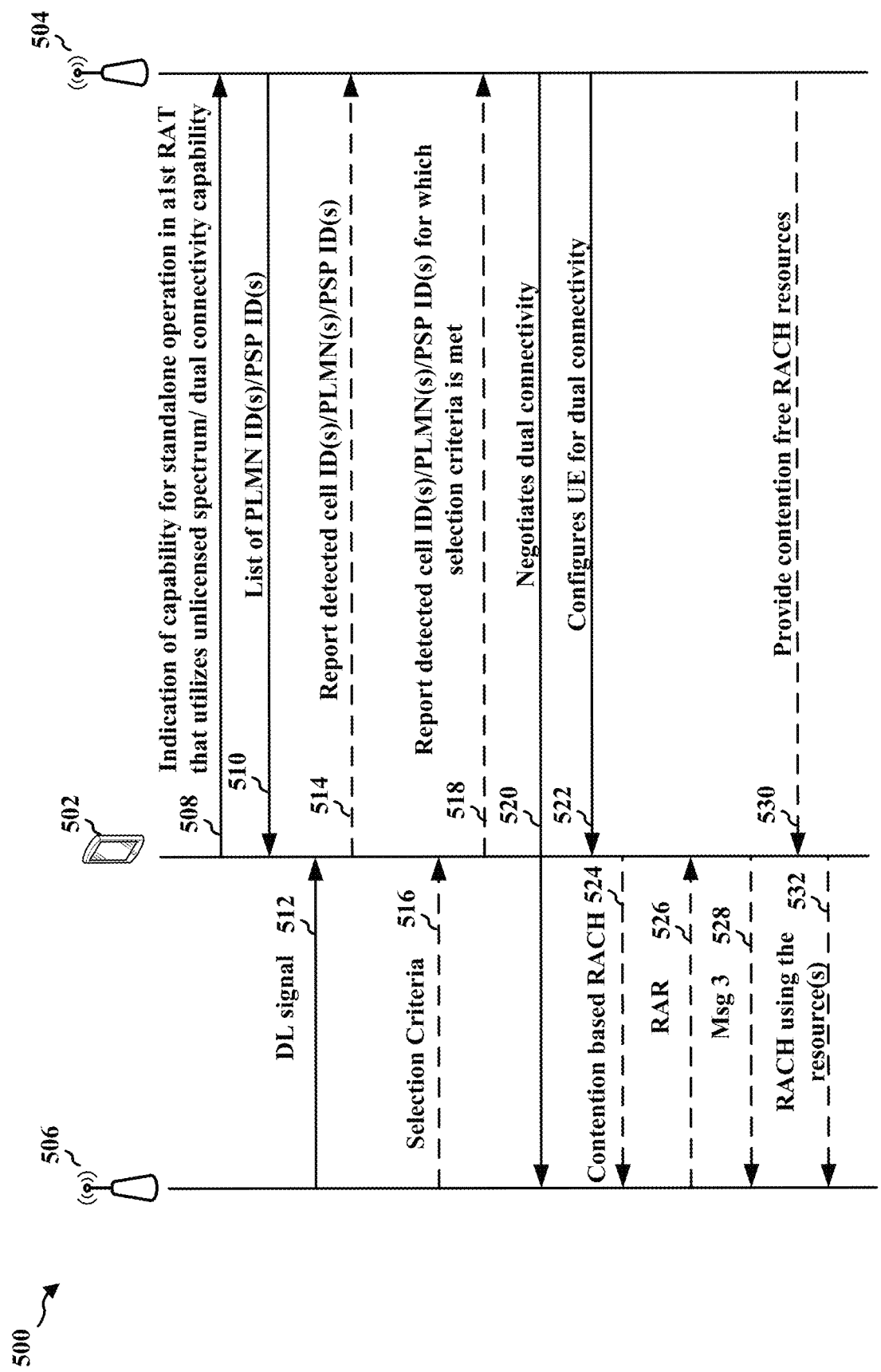
FIG. 5 is an example message flow for dual connectivity.

A UE may declare its capability for standalone operation in a first RAT that utilizes an unlicensed frequency spectrum and dual connectivity capability involving the first RAT and a second RAT that utilizes a licensed frequency spectrum to the network, e.g., in a UE capability exchange. In response, the master node may provide information that assists the UE in detecting nodes of the first RAT. FIG. 5 illustrates an example message flow 500 between a UE 502, a base station operating in the licensed spectrum, also referred to as a "licensed base station," 504 (e.g., an LTE eNB, another 3GPP eNB or a 5G NR base station), and a second node 506 (e.g., MF base station or other base station 190 of the first RAT) in performing a cell search and establishing dual connectivity involving the first RAT and a second RAT that utilizes a licensed frequency spectrum, where the UE is connected to both the licensed base station 504 and the second base station 506 at the same time. The standalone unlicensed base station 506 may provide additional radio resources to those obtained from licensed base station 504. The licensed base station 504 may operate as an master node and the second base station 506 may operate as the secondary node. In another example, the second base station 506 may operate as the master node, while licensed base station 504 operates as an secondary node. Optional aspects are illustrated with a dashed line. At 508, the UE may provide an indication of capability for standalone operation in a first RAT that utilizes an unlicensed frequency spectrum and dual connectivity capability involving the first RAT and a second RAT that utilizes a licensed frequency spectrum to the network, e.g., licensed base station 504. The licensed base station 504 may be the master node in the dual connectivity. The licensed base station 504 may provide, at 510, the UE with a list of PLMN IDs and/or Participating Service Provider (PSP) IDs for service providers in the first RAT for which the UE can search. The list may be a list of service providers that deploy base stations of the first RAT, e.g., to enable the UE to detect such base stations. In LTE, the UE only reports the cell-ID and measurements to the LTE network, and the LTE network then configures the SeNB if the LTE network learns the valid cell-ID has been reported. However, for dual connectivity, there may be many PSPs. Therefore, reporting the cell ID may not be sufficient to establish such dual connectivity (e.g., LTE-MF dual connectivity, etc.).

In a first example, UE 502 may detect a signal 512 from the second base station 506 and may report, at 514, a list of detected cell ID(s), PLMN ID(s), or PSP ID(s) to the licensed base station 504.

The licensed base station 504 may understand the cell selection criteria of the service provider and may determine the cell to which the UE can connect.

In a second example, UE 502 may read the SIBs received from the second base station 506 to determine whether the cell selection criterion for the second base station 506 is satisfied before signaling the list to the licensed base station 504. Thus, the second base station 506 may broadcast at 516, per PLMN ID or per PSP ID, cell selection criteria to satisfy different requirements of different service providers. The determination may include a PLMN ID and PSP ID check. Thus, the UE may report at 518 detected cell ID(s), PLMN ID(s), and PSP ID(s) that the UE detects and for which the selection criteria of the service provider are met to licensed base station 504.

At 520, the licensed base station 504 may negotiate dual connectivity with the second base station 506. At 522, the licensed base station 504 may configure the UE 502 for dual connectivity, e.g., LTE-MF dual connectivity, etc., with licensed base station 504 and the second base station 506. For example, the licensed base station 504 may configure the UE 502 with a PSCell and with additional SCells from the second base station, based on the report at either 514 or 518. As another example, the RRC configuration may be sent by the second base station 506 at a later stage rather than at 522. For example, an second base station 506 may configure any of PLMN specific timers, constants and other system parameters such as RACH, power control, etc.

The configuration, at 522, from licensed base station 504 regarding the secondary node might only establish the downlink connection with second base station 506. The UE may need to perform RACH on the uplink in order to establish the uplink timing for the second base station 506.

In a first example, the UE 502 may perform contention based RACH with the second base station 506 on the uplink at 524. In response, the UE may receive a Random Access Response (RAR) at 528 from the second base station 506. The UE may respond, e.g., in a Msg 3, at 528, indicating dual connectivity with licensed base station 504 as the connection setup cause.

In a second option, licensed base station 504 may provide an indication at 530 to the UE 502 of contention free RACH resources and/or C-RNTI for uplink timing advance/power control establishment. The UE may then use the contention free RACH resources to perform RACH at 532 with second base station 506. At times there may be Listen Before Talk (LBT) failure on a resource indicated as a contention free RACH. Therefore, at 530, the licensed base station 504 may indicate a number of upcoming, reserved RACH resources for performing RACH with the second base station 506. For example, the licensed base station 504 may indicate the number of reserved RACH resources for the next 5 instances. Five instances is merely an example, and the indicated number of instances may be fewer or more than 5. If RACH with the second base station 506 is not successful using the 5 instances of reserved RACH resources, the UE may report a connection setup failure to the licensed base station 504. Thus, the UE 502 may receive multiple contention free RACH resources to account for RACH LBT failure.

Band Specific Measurement Objects

Figure 6:
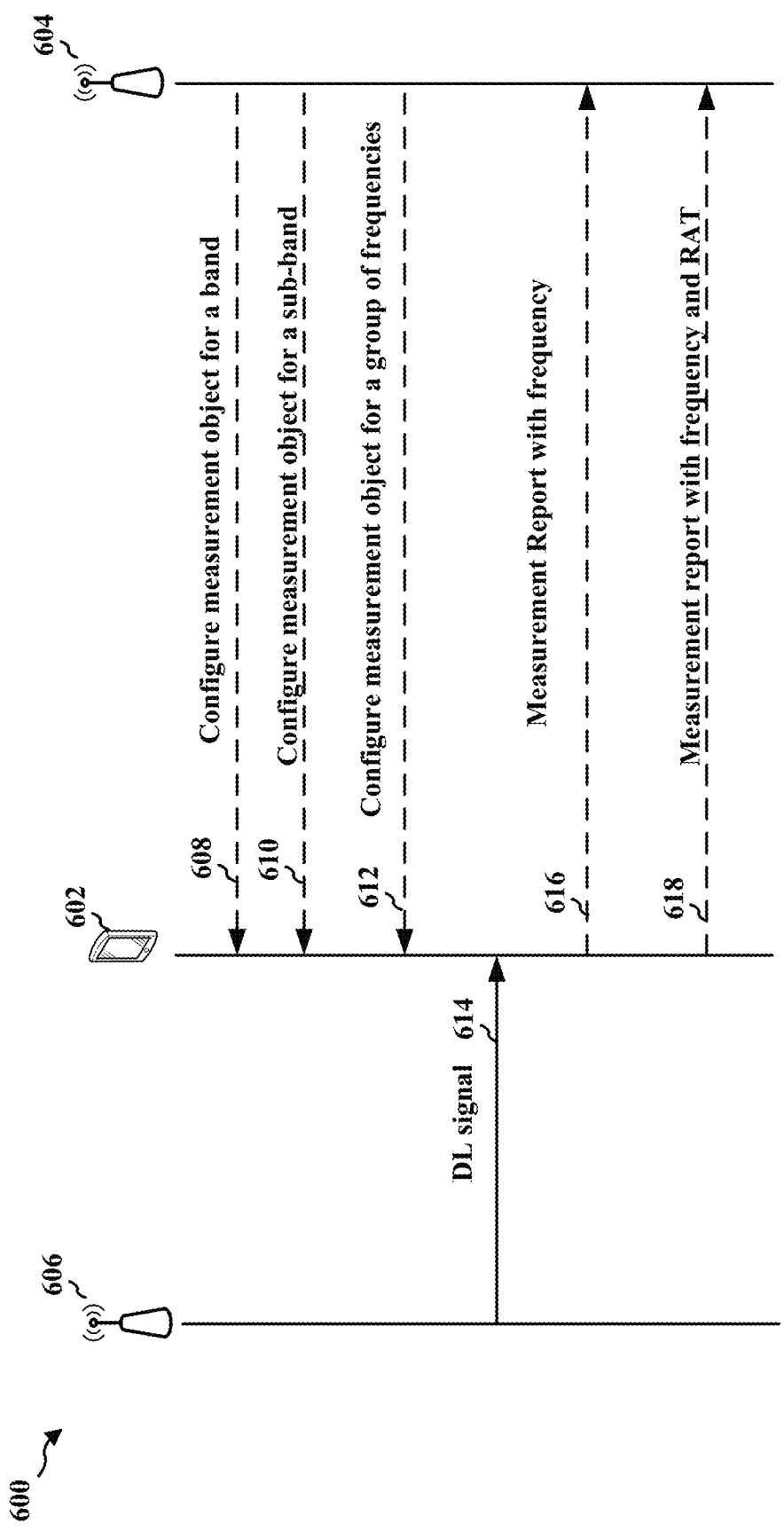
FIG. 6 is an example message flow for dual connectivity.

In LTE-DC, a measurement object is configured per frequency. However, a base station capable of standalone operation in a first RAT that utilizes an unlicensed frequency spectrum may change frequencies over time, e.g., to manage interference. Due to the frequency changes, a measurement object cannot be configured per frequency for dual connectivity with such a base station. FIG. 6 illustrates a message flow 600 between a UE 602, a licensed base station 604 (e.g., an LTE eNB, a 5G NR eNB, or a 3GPP eNB), and an second base station 606, e.g., capable of standalone operation in a first RAT that utilizes an unlicensed frequency spectrum, involving measurement objects, e.g., standalone unlicensed measurement objects, configured by the licensed base station 604. In one example, a measurement object for dual connectivity with a second base station 606 may be configured for an entire band, e.g., as at 608. In a second example, the measurement object for dual connectivity with a second base station 606 may be configured for a sub-band, as at 610. In a third example, the measurement object for dual connectivity with a second base station 606 may be configured for a group of frequencies, as at 612.

The UE may measure a signal received from the second base station 606 at 614 based on the measurement configuration received from the licensed base station 604.

The UE may then report the frequency along with the measurement report at 616. The UE may also report the RAT along with the frequency and the measurement report, e.g., at 618. Whether the UE reports the RAT, as at 618, may depend on a UE capability of the UE 602.

Mobility

In LTE dual connectivity, there is no handover on the SeNB, only an RRC reconfiguration. As presented herein, mobility in dual connectivity involving a second base station capable of standalone operation in a first RAT that utilizes an unlicensed frequency spectrum may involve handover between secondary nodes, and a second base station may inform the master node (e.g., LTE/3GPP/5G NR eNB) when a secondary node has changed to a different base station operating in the first RAT.

Figure 7:
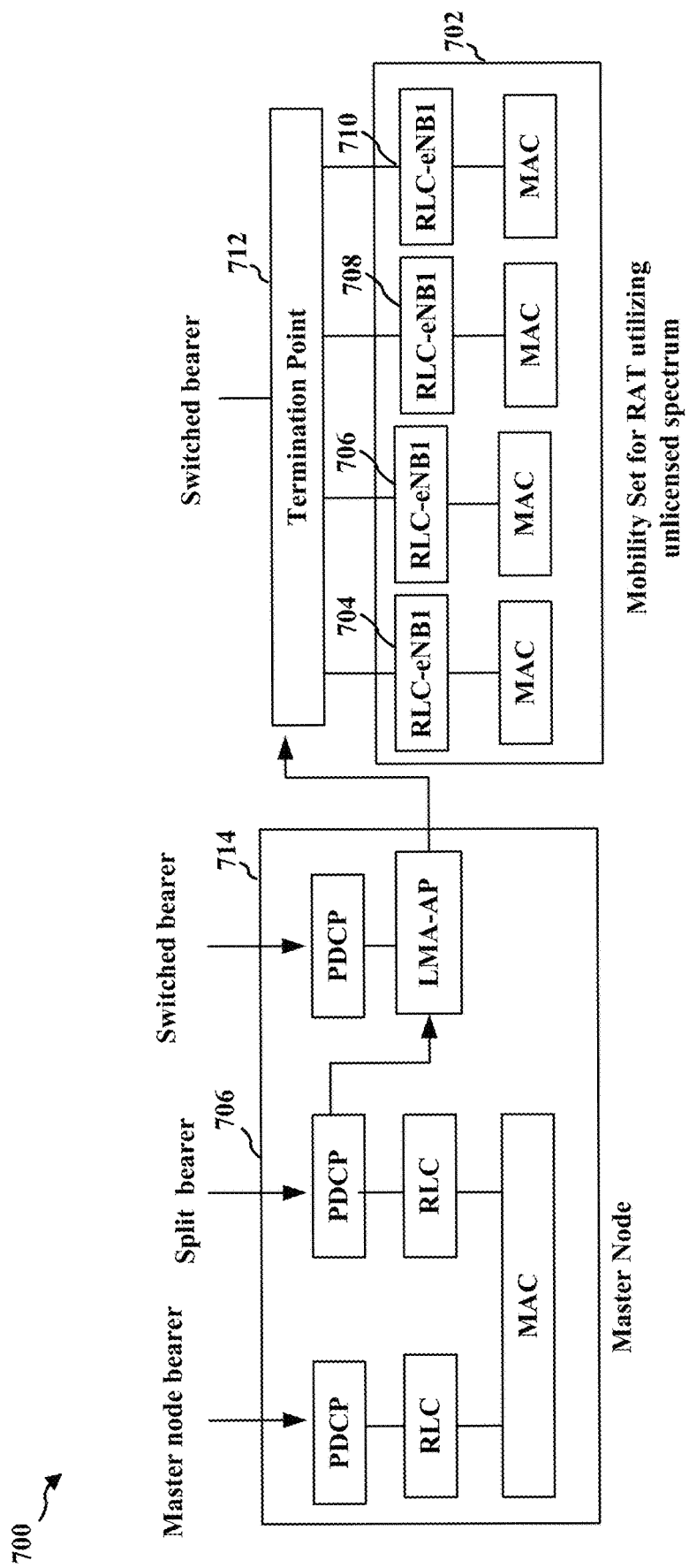
FIG. 7 is an example design for a mobility set for dual connectivity.

FIG. 7 illustrates an example in which base stations capable of standalone operation in the first RAT that utilizes an unlicensed frequency spectrum may be grouped into a mobility set 702. Mobility may be allowed between base stations within the mobility set, e.g., between any of base station 704, base station 706, base station 708, base station 710. When a UE is configured with the mobility set, handovers may be performed to a base station within the mobility set 702 without informing the master node 714. The base station (e.g., SeNB) might only inform the master node when a handover is made to a base station outside of the mobility set. Dual connectivity with master node 714 and mobility set 702 may involve a termination point 712 that is a logical entity that controls connection between the master node and the base stations of the mobility set 702. The mobility set 702 may be UE specific, e.g., a UE may be configured with a mobility set. Thus, UE specific mobility may be allowed between certain base stations without reporting secondary node changes to the master node. When a handover is needed to a base station outside of the mobility set, the base station may inform the master node. This allows mobility specific optimizations which are unique to operation in a RAT utilizing the unlicensed frequency spectrum such as autonomous mobility etc.

Dual RRC Configuration

A base station capable of standalone operation in the first RAT that utilizes an unlicensed frequency spectrum may make limited RRC reconfigurations and may signal a limited delta RRC configuration, e.g., in addition to the RRC configuration sent by the master node (in a container). For example, the base station may transmit a change (e.g., modification or addition) to the RRC configuration from the master node that do not involve a new SRB or DRB establishment. This may allow the base station to make quick RRC reconfigurations without the delay of going through the master node. For example, the base station may make a change to a PUCCH configuration without informing the MeNB. Instead, the base station may indicate this change directly to the UE in a limited RRC configuration.

Figure 8:
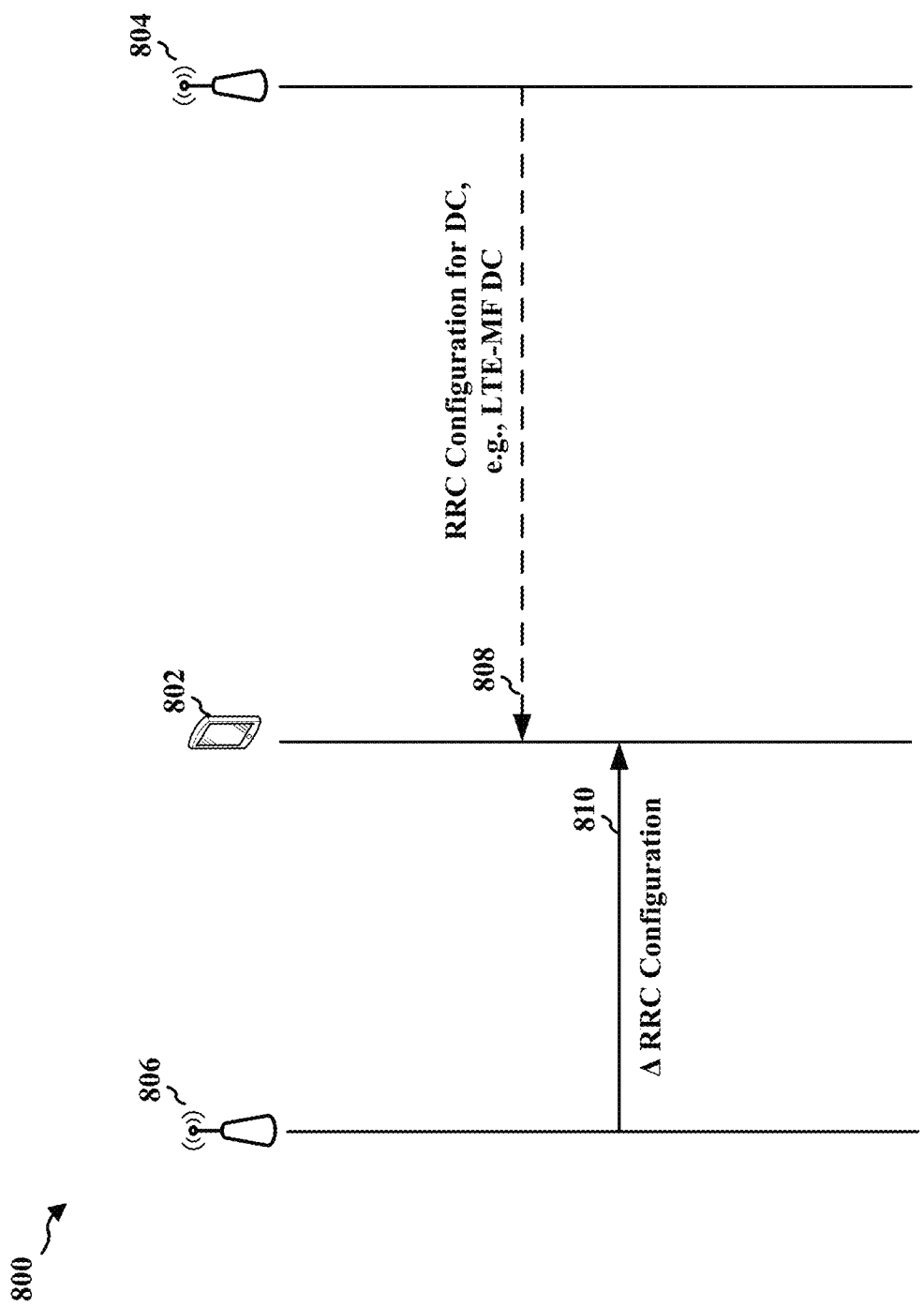
FIG. 8 is an example message flow for dual connectivity.

FIG. 8 illustrates an example message flow 800 between a UE 802, an master node (e.g. an LTE eNB, 3GPP eNB, or 5G NR base station) 804 and a second base station 806 capable of standalone operation in the first RAT that utilizes an unlicensed frequency spectrum. At 808, the master node may transmit an RRC configuration to the UE 802 with an RRC configuration for dual connectivity communication with the master node 804 and the second base station 808 as a secondary base station, e.g., a LTE-MF dual connectivity, etc. At 810, the second base station 806 may transmit a limited, delta RRC configuration with limited modifications to the RRC configuration transmitted at 808. The delta RRC configuration 810 may involve RRC configuration modifications that do not involve a new Signaling Radio Bearer (SRB) or Data Radio Bearer (DRB). The delta RRC configuration may comprise such modifications as a change to the PUCCH configuration for the second base station, for example.

Figure 9:
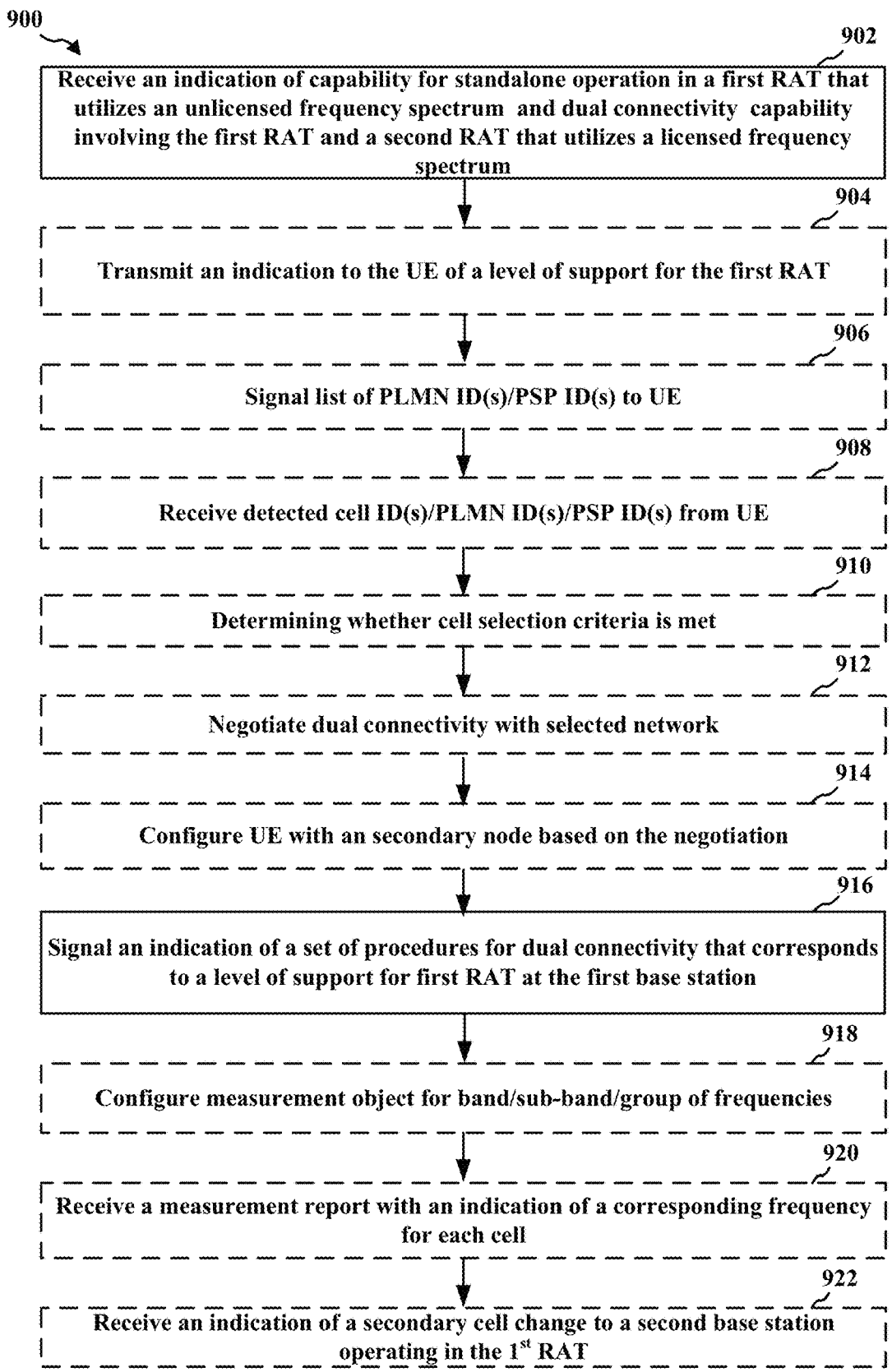
FIG. 9 is a flowchart of a method of wireless communication.

FIG. 9 is a flowchart 900 of a method of wireless communication. The method may be performed by a licensed base station, such an LTE, another 3GPP eNB, or a 5G NR base station. (e.g., base station 102, 310, 504, 604, 714, 804, the apparatus 1202, 1202'). Optional aspects are illustrated with a dashed line.

At 902, the base station receives an indication of capability for standalone operation in a first Radio Access Technology (RAT) that utilizes an unlicensed frequency spectrum and dual connectivity capability involving the first RAT and a second RAT that utilizes a licensed frequency spectrum, wherein the dual connectivity comprises the user equipment being connected to a master base station on a first frequency and a secondary base station on a second frequency at a same time from a user equipment (e.g., UE 104, 350, 502, 602, 802). Standalone unlicensed base station dual connectivity may comprise the user equipment being connected to a master base station (e.g., master node, MeNB) on a first frequency and a secondary base station (e.g., secondary node, SeNB, base station 190, 506, 606, 704, 706, 708, 710, 806) on a second frequency at a same time. One of the master base station and the secondary base station comprise a standalone base station operating in an unlicensed frequency range. For example, the secondary base station may provide additional radio resources to those obtained from master base station. The master base station or the secondary base station may comprise an MF base station, in one example of a base station in the first RAT that utilizes the unlicensed frequency spectrum.

At 916, the base station signals, to the UE, an indication of a set of procedures for dual connectivity communication with the master base station and the secondary base station, wherein the set of procedures corresponds to a level of support for the first RAT at the first base station. For example, FIG. 5 illustrates an example including such signaling between the UE and base station. The first base station may signal a first set of procedures for dual connectivity communication when the level of support at the first base station, e.g., master node, is at higher layers of the first RAT and the first base station signals a second set of procedures for dual connectivity when the level of support at the first base station extends to lower layers of the first RAT.

In a first example, the first set of procedures may comprise a joint power headroom report for both the first base station and the standalone unlicensed base station and the second set of procedures may comprise an independent power headroom report for the first base station and the base station of the first RAT. For example, the base station may request a PHR for LTE+MF dual connectivity operation and then may send standalone unlicensed information to the secondary node (e.g., SeNB) over an Xn interface.

In a second example, the first set of procedures may comprise a first RRC configuration indicating a power split between the master base station and the secondary base station, and the second set of procedures may comprise a second RRC configuration without the power split between the first base station and a second base station of the first RAT.

In a third example, the first set of procedures may comprise buffer status reporting on based on split bearers between the master base station and the secondary base station, and the second set of procedures may comprise independent buffer status reporting for the first base station and a base station of the first RAT.

At 904, the base station may transmit an indication to the user equipment regarding the level of support for the first RAT at the first base station.

The base station may also provide information to the user equipment to assist in cell searching for a service provider of the first RAT. The base station may transmit, at 906, a list of service providers that provide access to the first RAT to the user equipment for cell searching. The list may comprise at least one of a PLMN ID or a PSP ID for at least one service provider.

In response, the base station may receive, at 908, a response from the user equipment comprising a PLMN ID and/or a PSP ID for at least one detected service provider from the list. The at least one detected service provider may comprise a network for which the user equipment determined that cell selection criteria was met. Thus, the UE may bear the burden of determining whether cell selection criteria is met. In another example, at 910, the base station may determine whether cell selection criteria for the at least one detected service provider is met for the UE. In this example, the selected service provider may be a service provider for which the base station determined that the cell selection criteria is met. The base station may negotiate, at 912, dual connectivity with a selected service provider from the at least one detected service provider. Then, the base station may configure, at 914, the UE with a secondary cell, e.g., for dual connectivity with the selected service provider, based on the negotiating.

At 918, the base station may configure a measurement object, e.g., a measurement object, for at least one of a frequency band, a frequency sub-band, or a group of frequencies. An example of such a configuration is described in connection with FIG. 6. At 920, the base station may receive a measurement report from the UE along with an indication of a corresponding frequency for each cell in the measurement report. The measurement report may comprise an indication of a RAT corresponding to the measurement report.

The base station may receive, at 922, from the base station of the first RAT, an indication of a secondary cell change to a second base station of the first RAT. An example of such an indication is described in connection with FIG. 7. The UE may be configured with a mobility set comprising a plurality of base stations of the first RAT, wherein mobility changes are only reported for secondary cell changes outside of the mobility set. Thus, mobility changes for a secondary node (e.g., SeNB) within the mobility set may not be reported.

Figure 10A:
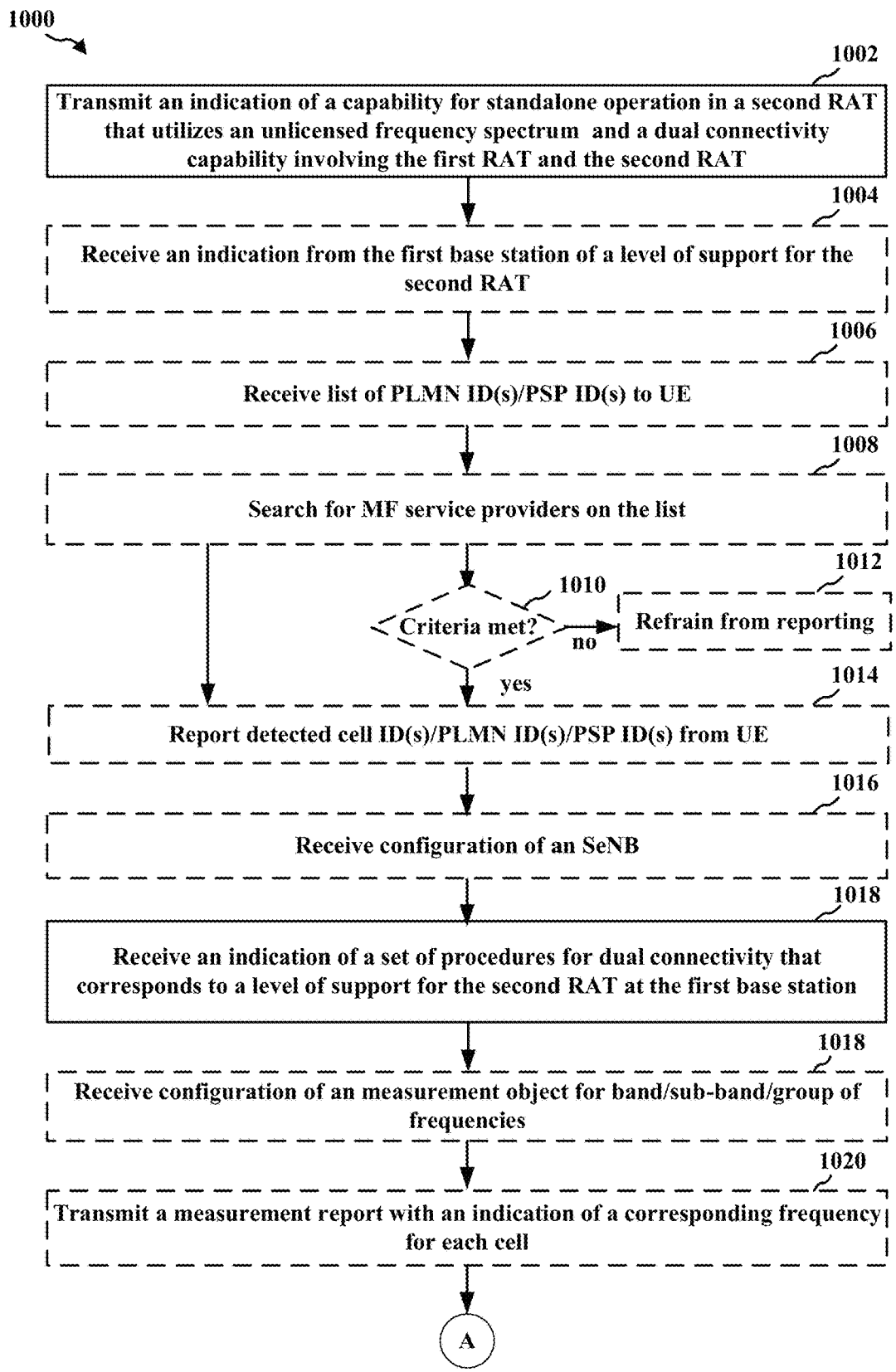
FIGS. 10A and 10B illustrate a flowchart of a method of wireless communication.
Figure 10B:
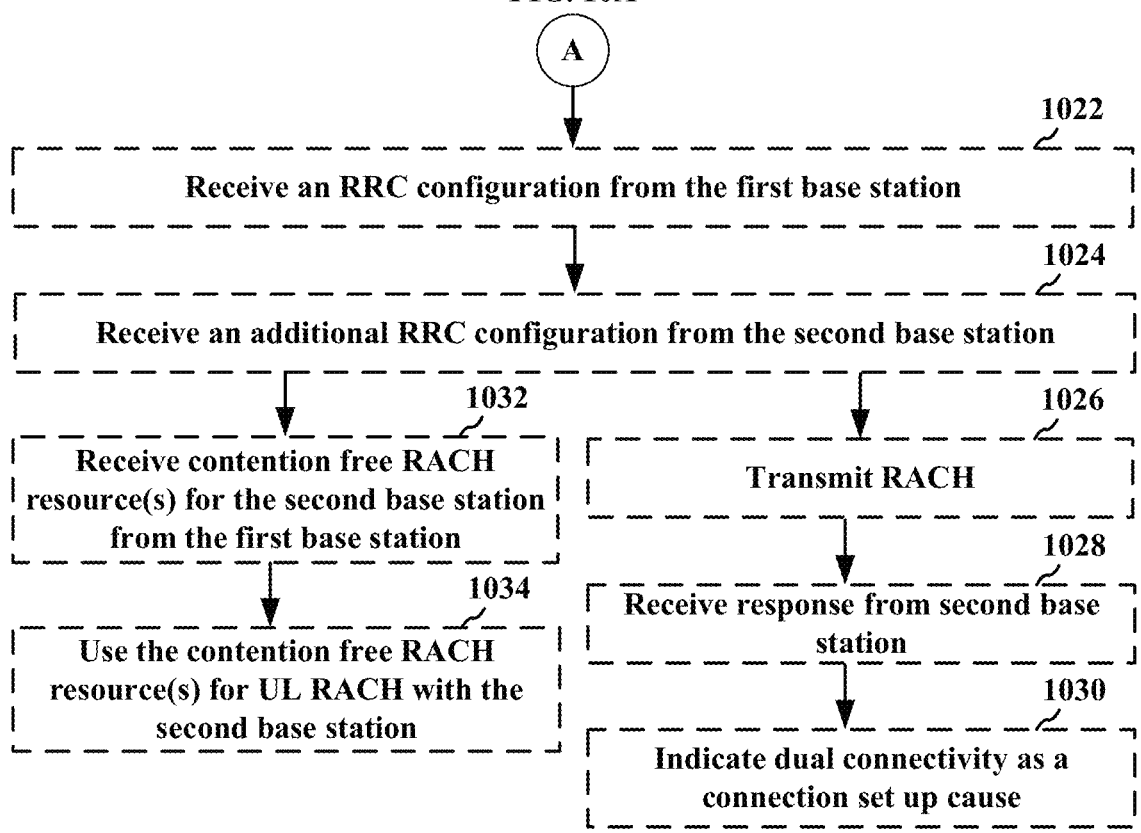

FIGS. 10A and 10B illustrate a flowchart 1000 of a method of wireless communication. The method may be performed by a UE (e.g., UE 104, 350, 502, 602, 802, the apparatus 1402, 1402'). Optional aspects are illustrated with a dashed line. At 1002, the UE transmits an indication of a capability for standalone operation in a second RAT that utilizes an unlicensed frequency spectrum to a first base station using a first RAT in a licensed frequency spectrum, such an LTE eNB, other 3GPP eNB, or 5G NR base station (e.g., base station 102, 310, 504, 604, 714, 804). The UE may also signal a dual connectivity capability involving the first RAT and the second RAT, wherein the dual connectivity comprises the user equipment being connected to the first base station as a master base station on a first frequency and a second base station using the second RAT as a secondary base station on a second frequency at a same time. The master base station or the secondary base station may comprise the second base station of the second RAT. The secondary base station may provide additional radio resources to those obtained from master base station.

At 1018, the UE receives an indication from the first base station of a set of procedures for dual connectivity communication with the first base station as the master base station and the second base station as a secondary base station, wherein the set of procedures corresponds to a level of support for second RAT at the first base station. The first base station may signal a first set of procedures for dual connectivity when the level of support at the master node is at higher layers of the second RAT, and the first base station may signal a second set of procedures for dual connectivity when the level of support at the master node extends to lower layers of the second RAT.

Table 1 illustrates various examples of different procedures based on whether the first base station support extends only to higher layers of the second RAT or extends to lower layers of the second RAT. In one example, the second set of procedures may comprise a joint power headroom report for both the first base station and the second base station and the first set of procedures comprises an independent power headroom report for the first base station and the second base station. In another example, the second set of procedures may comprise a first RRC configuration indicating a power split between the master base station and the secondary base station, and the first set of procedures may comprise a second RRC configuration without the power split between the first base station and the second base station. In another example, the second set of procedures may comprise buffer status reporting on based on split bearers between the master base station and the secondary base station, and the first set of procedures may comprise independent buffer status reporting for the first base station and the second base station.

At 1004, the UE may receive an indication from the first base station regarding the level of support for the second RAT at the first base station.

The first base station may provide information that assists the UE in performing cell searches for a service provider of the second RAT. For example, at 1006, the UE may receive a list of service providers providing access to the second RAT to the user equipment for cell searching. The list may comprise at least one of a PLMN ID or a PSP ID for at least one service provider. Then, at 1008, the UE may search for service providers based on the list received at 1006.

In one example, when a service provider from the list is detected, the UE may determine, at 1010 whether cell selection criteria is satisfied based on signaling from the service provider. When selection criteria is met, at 1014, the UE may report the detected service provider to the first base station. When selection criteria is not met, at 1012, the UE may refrain from reporting the detected service provider to the first base station.

In another example, the UE may report detects service providers without determining whether selection criteria is met. Instead, the UE may report, at 1014, at least one detected service provider to the first base station, including a corresponding PLMN ID or PSP ID. The first base station may make determinations about whether selection criteria for the service provider are met before configuring the UE with a secondary base station.

At 1016, the UE may receive a configuration of the secondary base station based on the reporting of at least one detected service provider at 1014.

The UE may transmit RACH communication to establish an uplink timing of the second base station at 1026. At 1028, the UE may receive a response from the second base station. At 1030, the UE may indicate, to the second base station, dual connectivity with the first base station is a connection setup cause.

In another example, the UE may receive contention free RACH resources for the second base station from the first base station at 1032. At 1034, the UE may use the contention free RACH resources for uplink RACH communication with the second base station. The UE may receive multiple contention free RACH resources to account for RACH LBT failure.

The first base station may also provide information used for measurement reporting. At 1018, the UE may receive a configuration of a measurement object, e.g., a second measurement object, from the first base station for at least one of a frequency band, a frequency sub-band, or a group of frequencies. The UE may perform the measurements according to the configuration. At 1020, the UE may transmit a measurement report from the UE along with an indication of a corresponding frequency for each cell in the measurement report. The measurement report comprises an indication of a RAT corresponding to each cell in the measurement report.

At 1022, the UE may receive an RRC configuration from the first base station for the second base station as a secondary base station in dual connectivity. At 1024, the UE may receive an additional RRC configuration from the second base station. The additional RRC configuration comprises a change to the RRC configuration from the first base station that does not involve establishment of a new SRB or DRB.

Figure 11:
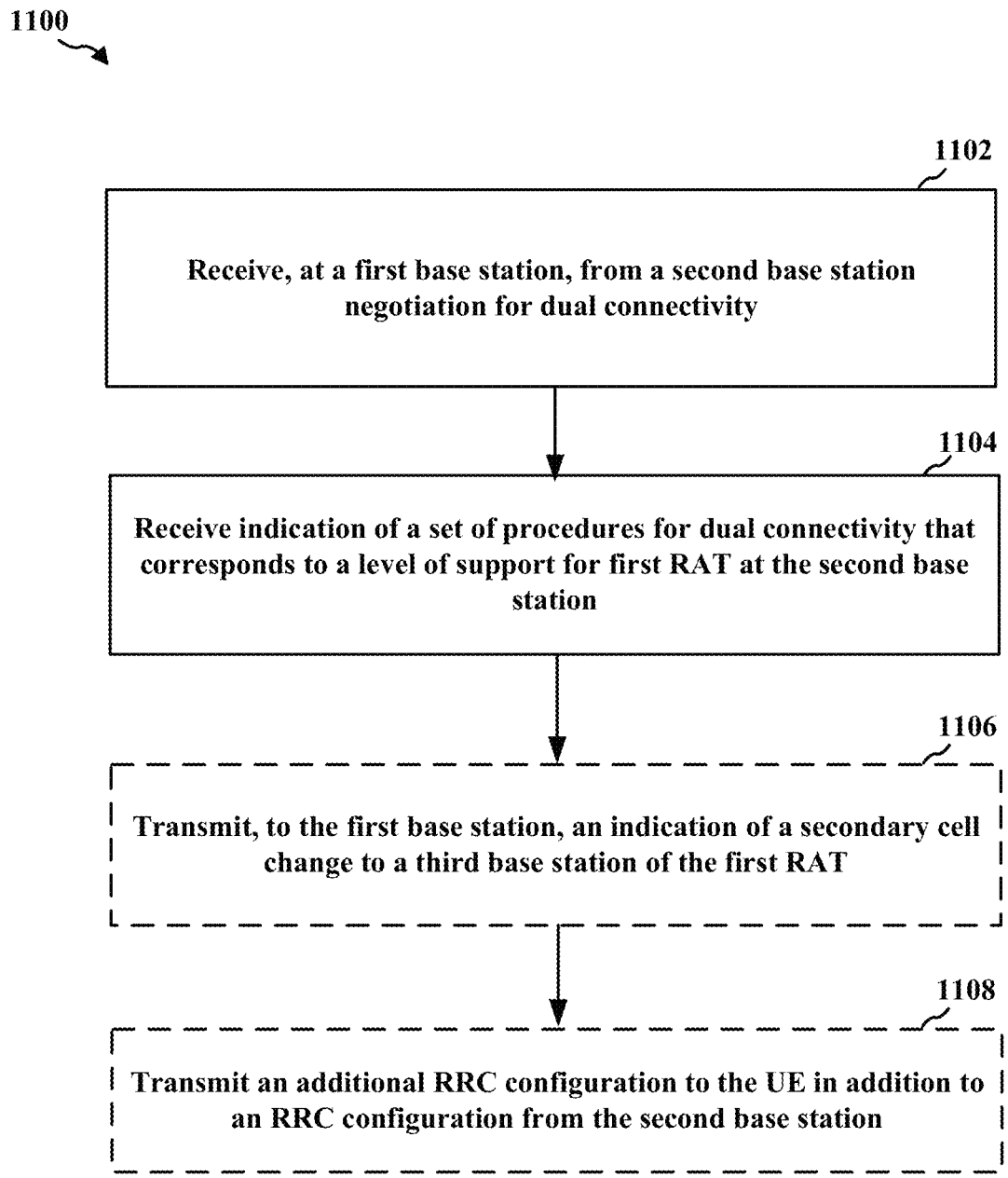
FIG. 11 is a flowchart of a method of wireless communication.

FIG. 11 is a flowchart 1100 of a method of wireless communication. The method may be performed by a first base station capability for standalone operation in a first RAT that utilizes an unlicensed frequency spectrum, such as an MF base station (e.g., base station 190, 310, 506, 606, 704, 706, 708, 710, 806, the apparatus 1602, 1602') configured as a secondary node (e.g., SeNB) for dual connectivity with a base station operating in a second RAT utilizing the licensed frequency spectrum (e.g., LTE, another 3GPP base station, or a 5G NR base station, e.g., base station 102, 350, 504, 604, 714, 804). For example, in dual connectivity, the secondary node may provide additional radio resources to those obtained from master node. Optional aspects are illustrated with a dashed line.

At 1102, the first base station may receive, from a second base station, negotiation for dual connectivity communication with a user equipment (e.g., UE 104, 350, 502, 602, 802), wherein dual connectivity comprises the user equipment being connected to the second base station as a master base station on a first frequency and the first base station as a secondary base station on a second frequency at a same time.

At 1104, the first base station receives an indication of a set of procedures for dual connectivity communication with the second base station as the master base station and the first base station as a secondary base station, wherein the set of procedures corresponds to a level of support for the first RAT at the second base station.

The second base station may signal a first set of procedures for dual connectivity when the level of support at the master node is at higher layers of the first RAT and the second base station signals a second set of procedures for dual connectivity when the level of support at the master node extends to lower layers of the first RAT. An example of such signaling is described in connection with FIG. 5 and table 1.

In a first example, the second set of procedures may comprise a joint power headroom report for both the first base station and the second base station and the first set of procedures may comprise an independent power headroom report for the first base station and the second base station.

In a second example, the second set of procedures may comprise a first radio resource control (RRC) configuration indicating a power split between the master base station and the secondary base station, and the first set of procedures may comprise a second RRC configuration without the power split between the first base station and the second base station.

In a third example, the second set of procedures may comprise buffer status reporting on based on split bearers between the master base station and the secondary base station, and the first set of procedures may comprise independent buffer status reporting for the first base station and the second base station.

At 1106, the base station may transmit, to the second base station, an indication of a secondary cell change to a third base station of the first RAT. The UE may be configured with an mobility set comprising a plurality of base stations of the first RAT, wherein mobility changes are only reported for secondary cell changes outside of the mobility set. An example of such a mobility set is described in connection with FIG. 7.

At 1108, the first base station may transmit an additional RRC configuration to the user equipment in addition to an RRC configuration from the second base station. The additional RRC configuration may comprise a change to the RRC configuration from the second base station that does not involve establishment of a new SRB/DRB.

Figure 12:
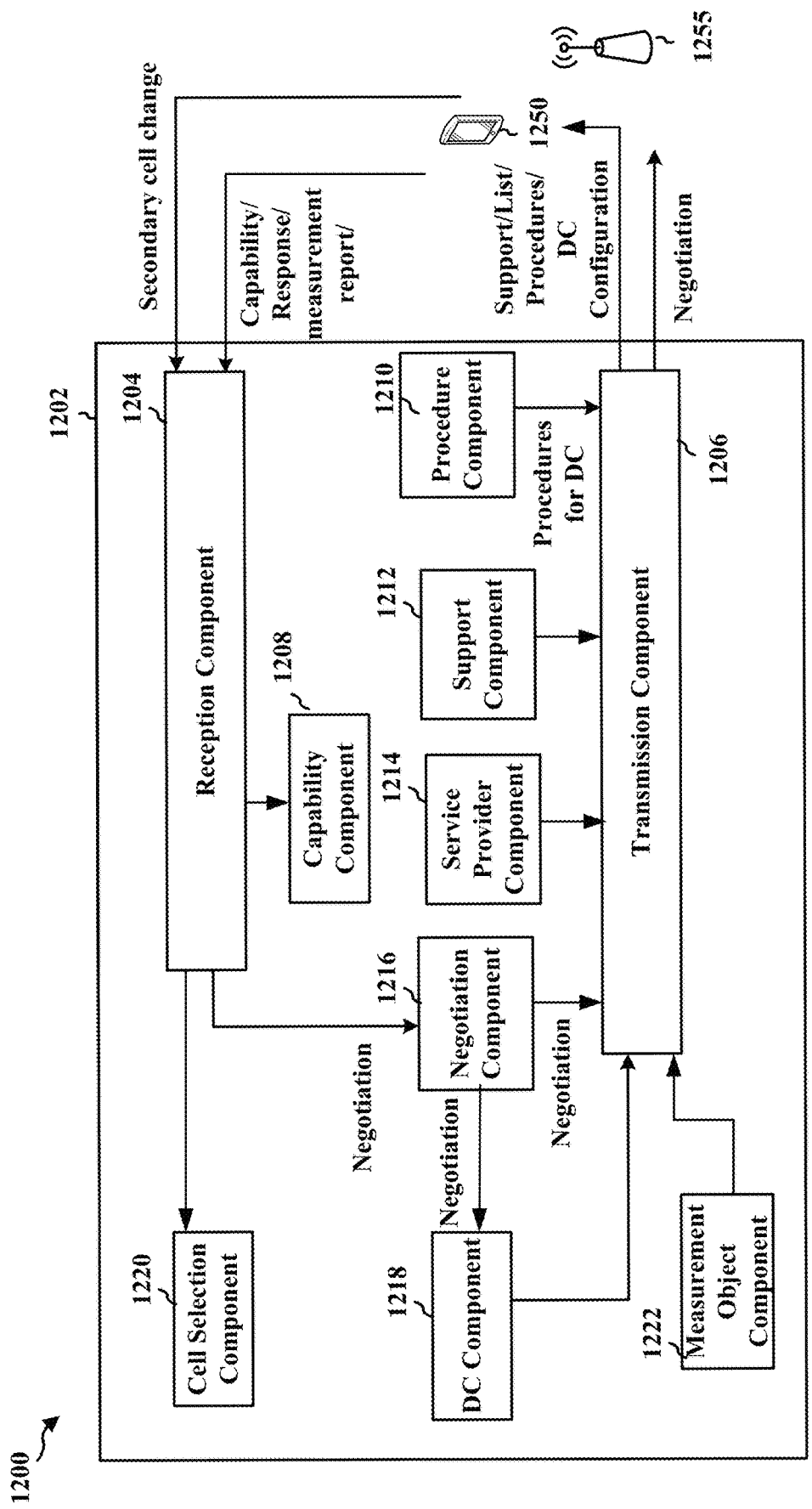
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a base station, e.g., a licensed base station, a master base station, an MeNB, such an LTE eNB, another 3GPP eNB, or a 5G NR base station (e.g., base station 102, 310, 504, 604, 714, 804). The apparatus includes a reception component 1204 that receives communication from UE 1250 and other base station 1255, e.g., secondary node, base station capable of standalone operation in a first RAT utilizing an unlicensed frequency spectrum, SeNB (e.g., base station 190, 506, 606, 704, 706, 708, 710, 806) and a transmission component 1206 that transmits communication the UE 1250 and other base station 1255.

The apparatus includes a capability component 1208 configured to from a user equipment, an indication of capability for standalone operation in a first Radio Access Technology (RAT) that utilizes an unlicensed frequency spectrum and dual connectivity capability involving the first RAT and a second RAT that utilizes a licensed frequency spectrum, wherein the dual connectivity comprises the user equipment being connected to a master base station on a first frequency and a secondary base station on a second frequency at a same time. The apparatus includes a procedure component 1210 configured to signal, to the UE, an indication of a set of procedures for dual connectivity communication with the master base station and the secondary base station, wherein the set of procedures corresponds to a level of support for the first RAT at the first base station. The apparatus includes a support component 1212 configured to transmit an indication to the user equipment regarding the level of support for the first RAT at the first base station. The apparatus includes service provider component 1214 configured to transmit a list of service providers that provide access to the first RAT to the user equipment for cell searching. The reception component 1204 may be configured to receive a response from the user equipment comprising a PLMN ID and a PSP ID for at least one detected service provider from the list. The apparatus includes a negotiation component 1216 configured to negotiate dual connectivity with a selected service provider from the at least one detected service provider. The apparatus includes a DC component 1218 that configures the UE for dual connectivity with the selected service provider based on the negotiating. The apparatus includes a cell selection component 1220 configured to determine whether cell selection criteria for the at least one detected service provider is met for the UE. The apparatus includes a measurement object component 1222 that configures a measurement object for at least one of a frequency band, a frequency sub-band, or a group of frequencies. The reception component 1204 may be configured to receive a measurement report from the UE along with an indication of a corresponding frequency for each cell in the measurement report. The reception component 1204 may be configured to receive, from a second base station of the first RAT, an indication of a secondary cell change to a third base station of the first RAT.

The apparatus may include additional components that perform each of the blocks of the algorithm in the aforementioned flowcharts of FIGS. 5-9. As such, each block in the aforementioned flowcharts of FIGS. 5-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
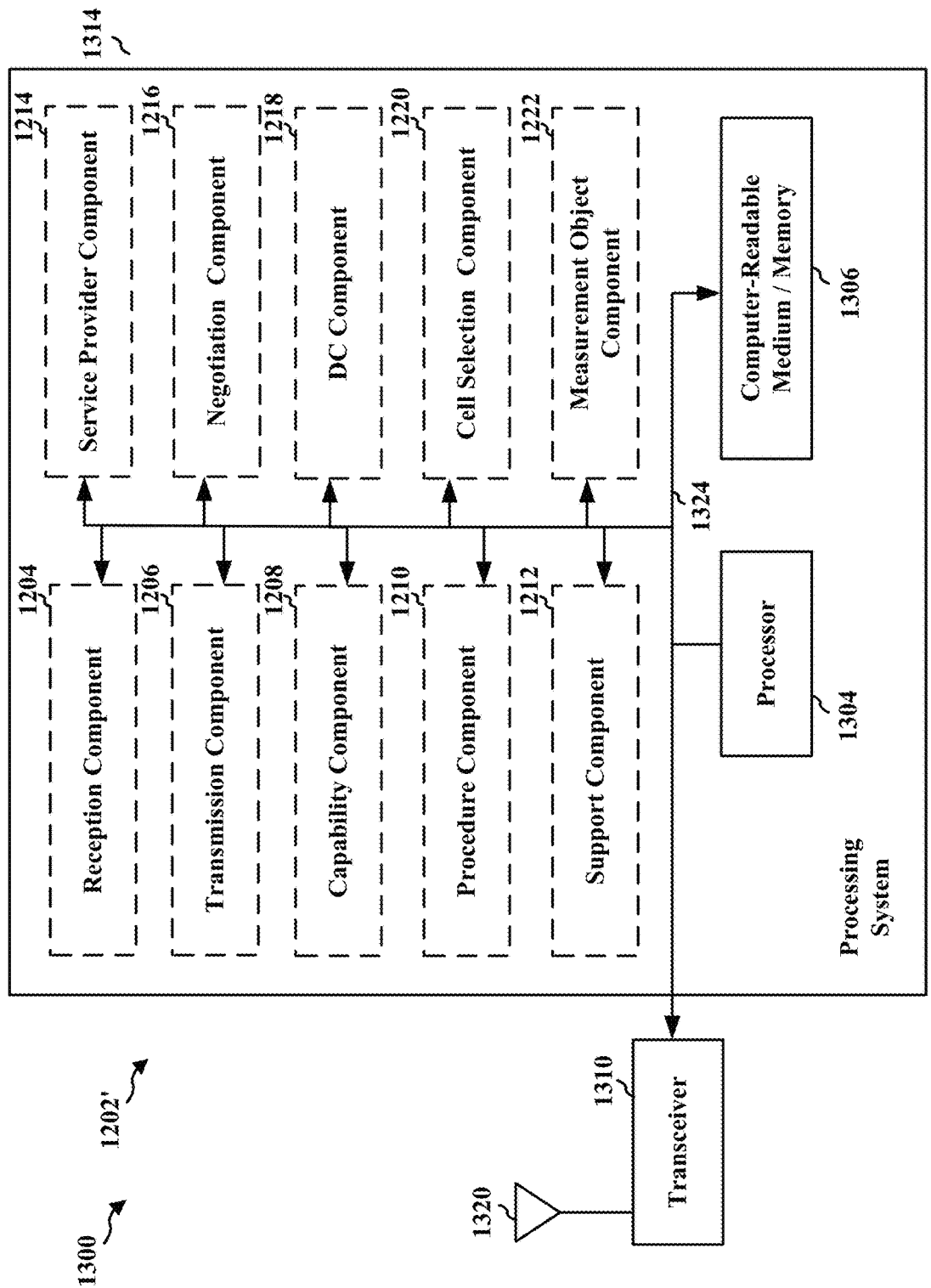
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1214, 1216, 1218, 1220, 1222, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214, 1216, 1218, 1220, 1222. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375.

In one configuration, an apparatus for wireless communication at a base station (e.g., an MeNB) includes means for receiving, from a user equipment, an indication of capability for standalone operation in a first RAT that utilizes an unlicensed frequency spectrum and dual connectivity capability involving the first RAT and a second RAT that utilizes a licensed frequency spectrum, wherein the dual connectivity comprises the user equipment being connected to a master base station on a first frequency and a secondary base station on a second frequency at a same time, means for signaling, to the UE, an indication of a set of procedures for dual connectivity communication with the master base station and the secondary base station, wherein the set of procedures corresponds to a level of support for the first RAT at the first base station, means for transmitting an indication to the user equipment regarding the level of support for the first RAT at the first base station, means for transmitting a list of service providers that provide access to the first RAT to the user equipment for cell searching, means for receiving a response from the user equipment comprising a PLMN ID and a PSP ID for at least one detected service provider from the list, means for negotiating dual connectivity with a selected service provider from the at least one detected service provider, means for configuring the UE for dual connectivity with the selected service provider based on the negotiating, means for determining whether cell selection criteria for the at least one detected service provider is met for the UE, means for configuring a measurement object for at least one of a frequency band, a frequency sub-band, or a group of frequencies, means for receiving a measurement report from the UE along with an indication of a corresponding frequency for each cell in the measurement report, and means for receiving, from the base station, an indication of a secondary cell change to a second base station. The aforementioned means may be one or more of the aforementioned components of the apparatus and/or the processing system of the apparatus configured to perform the functions recited by the aforementioned means. As described supra, the processing system may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 14:
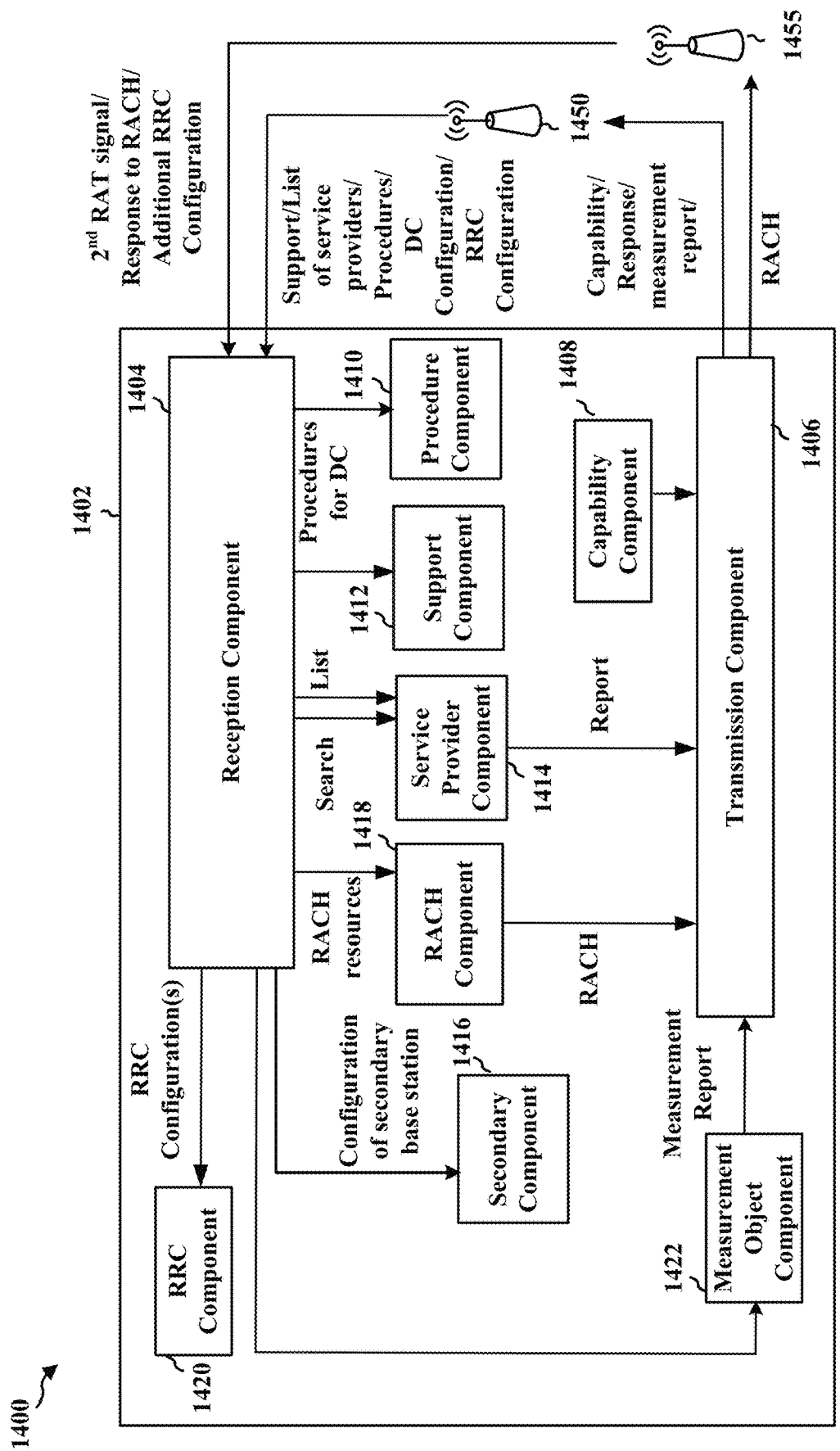
FIG. 14 is a conceptual data flow diagram illustrating the data flow between different means/components in an exemplary apparatus.

FIG. 14 is a conceptual data flow diagram 1400 illustrating the data flow between different means/components in an exemplary apparatus 1402. The apparatus may be a UE (e.g., UE 104, 350, 502, 602, 802). The apparatus includes a reception component 1404 that receives downlink communication from a first base station 1450 using a first RAT in a licensed frequency spectrum (e.g., base station 102, 310, 504, 604, 714, 804) and a second base station 1455 capable of standalone operation in a second RAT that utilizes an unlicensed frequency spectrum. The apparatus includes a transmission component 1406 that transmits uplink communication to base stations 1450, 1455.

The apparatus, to the first base station 1450, includes a capability component 1408 configured to transmit an indication of a capability for standalone operation in a second RAT that utilizes an unlicensed frequency spectrum and a dual connectivity capability involving the first RAT and the second RAT. The apparatus includes a procedure component 1410 configured to receive an indication from the first base station 1450 of a set of procedures for dual connectivity communication with the first base station as the master base station and the second base station 1455 as a secondary base station, wherein the set of procedures corresponds to a level of support for the second RAT at the first base station. The apparatus includes a support component 1412 configured to receive an indication from the first base station regarding the level of support for second RAT at the first base station 1450. The reception component 1404 may receive a list of service providers that provide access to the second RAT sent to the user equipment for cell searching. The apparatus includes a service provider component 1414 configured to search for service providers (e.g., 1455) based on the list. The service provider component 1414 may determine whether cell selection criteria is satisfied based on signaling from the service provider and either report the detected service provider to the first base station or refrain from reporting the detected service provider to the first base station. The apparatus may include a secondary component 1416 configured to receive a configuration of the secondary base station based on the reporting the detected service provider to the base station. The service provider component 1414 may search for service providers based on the list and may report at least one detected service provider to the first base station, including a corresponding PLMN ID and PSP ID. The secondary component 1416 may receive a configuration of the secondary base station based on the reporting the at least one detected service provider. The apparatus may comprise a RACH component 1418 configured to transmit RACH communication to establish an uplink timing of the second base station. The reception component 1404 may receive a response from the second base station. The transmission component 1406 may be configured to indicate, to the second base station, dual connectivity with the first base station is a connection setup cause. The reception component 1404 may receive contention free RACH resources for the second base station from the first base station. The RACH component 1418 may be configured to use the contention free RACH resources for uplink RACH communication with the second base station. The reception component 1404 may receive a configuration of a measurement object from the first base station for at least one of a frequency band, a frequency sub-band, or a group of frequencies. The apparatus may include a measurement object component 1420 configured to transmit a measurement report from the UE along with an indication of a corresponding frequency for each cell in the measurement report. The apparatus may include an RRC component 1422 configured to receive a RRC configuration from the first base station for the second base station as a secondary base station in dual connectivity. The RRC component may also be configured to receive an additional RRC configuration from the second base station.

The apparatus may include additional components that perform each of the blocks of the algorithm in the aforementioned flowcharts of FIGS. 5-8 and 10A, 10B. As such, each block in the aforementioned flowcharts of FIGS. 5-8 and 10A, 10B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
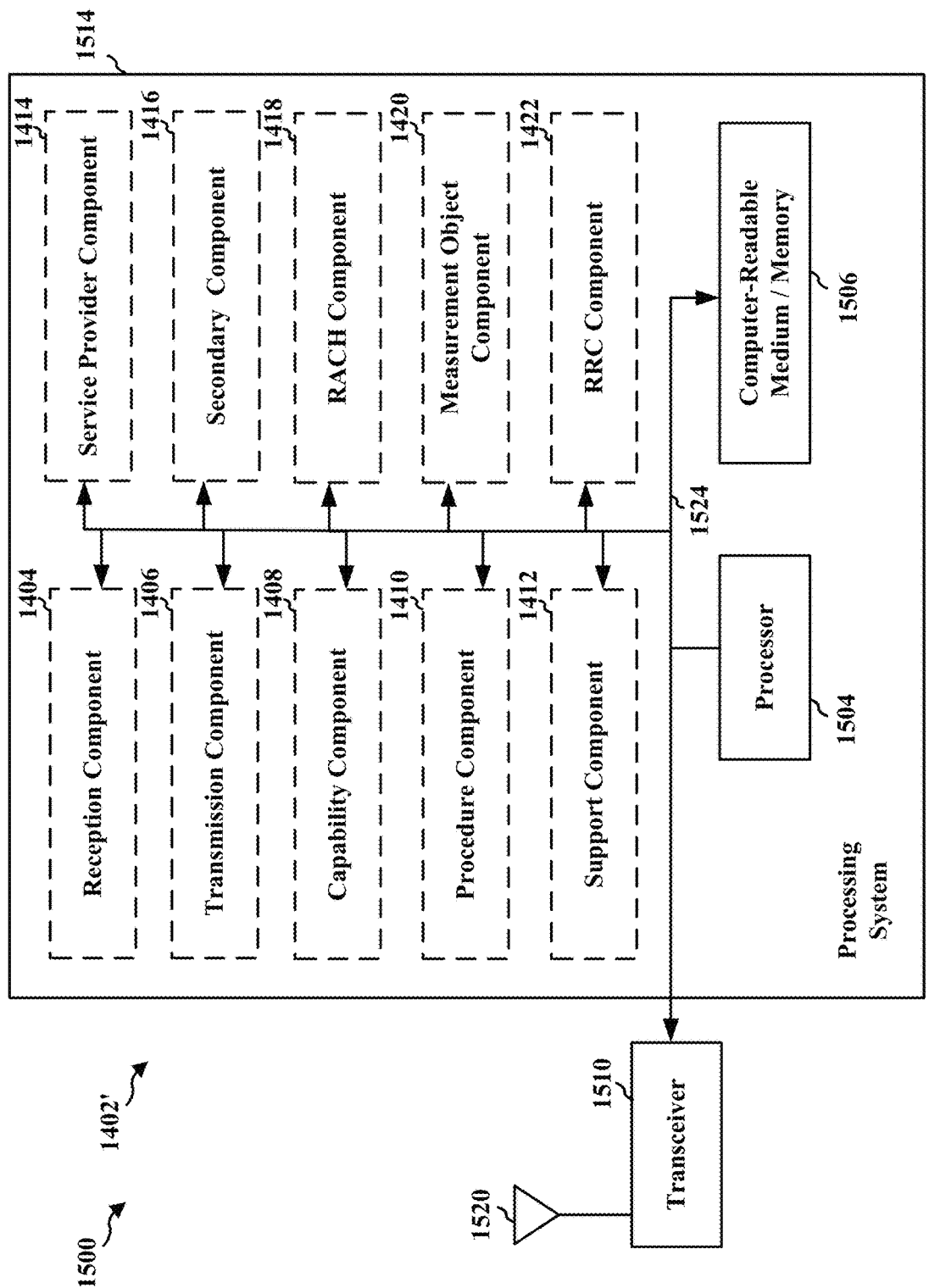
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, 1414, 1416, 1418, 1420, 1422, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1406, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412, 1414, 1416, 1418, 1420, 1422. The components may be software components running in the processor 1504, resident/stored in the computer readable medium/memory 1506, one or more hardware components coupled to the processor 1504, or some combination thereof. The processing system 1514 may be a component of the UE 350 and may include the memory 360 and/or at least one of the TX processor 368, the RX processor 356, and the controller/processor 359.

In one configuration, an apparatus for wireless communication at a UE may include means for transmitting, to a first base station using a first Radio Access Technology (RAT) in a licensed frequency spectrum, an indication of a capability for standalone operation in a second RAT that utilizes an unlicensed frequency spectrum and a dual connectivity capability involving the first RAT and the second RAT, wherein the dual connectivity comprises the user equipment being connected to the first base station as a master base station on a first frequency and a second base station using the second RAT as a secondary base station on a second frequency at a same time, means for an indication from the first base station of a set of procedures for dual connectivity communication with the master base station and the secondary base station, wherein the set of procedures corresponds to a level of support for the second RAT at the first base station, means for receiving a list of service providers that provide access to the second RAT to the user equipment for cell searching, means for searching for service providers based on the list, means for determining whether cell selection criteria is satisfied based on signaling from the service provider, means for reporting the detected service provider to the first base station, means for refraining from reporting the detected service provider to the first base station, means for receiving a configuration of the secondary base station based on the reporting the detected service provider to the base station, means for searching for service providers based on the list, means for reporting at least one detected service provider to the first base station, including a corresponding PLMN ID and PSP ID, means for receiving a configuration of the secondary base station based on the reporting the at least one detected service provider, means for transmitting RACH communication to establish an uplink timing of the second base station, means for receiving a response from the second base station, means for indicating, to the base station, dual connectivity with the first base station is a connection setup cause, means for receiving contention free RACH resources for the second base station from the first base station, means for using the contention free RACH resources for uplink RACH communication with the second base station, means for receiving a configuration of a measurement object from the first base station for at least one of a frequency band, a frequency sub-band, or a group of frequencies, means for transmitting a measurement report from the UE along with an indication of a corresponding frequency for each cell in the measurement report, means for receiving a RRC configuration from the first base station for the second base station as a secondary base station in dual connectivity, and means for receiving an additional RRC configuration from the second base station. The aforementioned means may be one or more of the aforementioned components of the apparatus and/or the processing system of the apparatus configured to perform the functions recited by the aforementioned means. As described supra, the processing system may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 16:
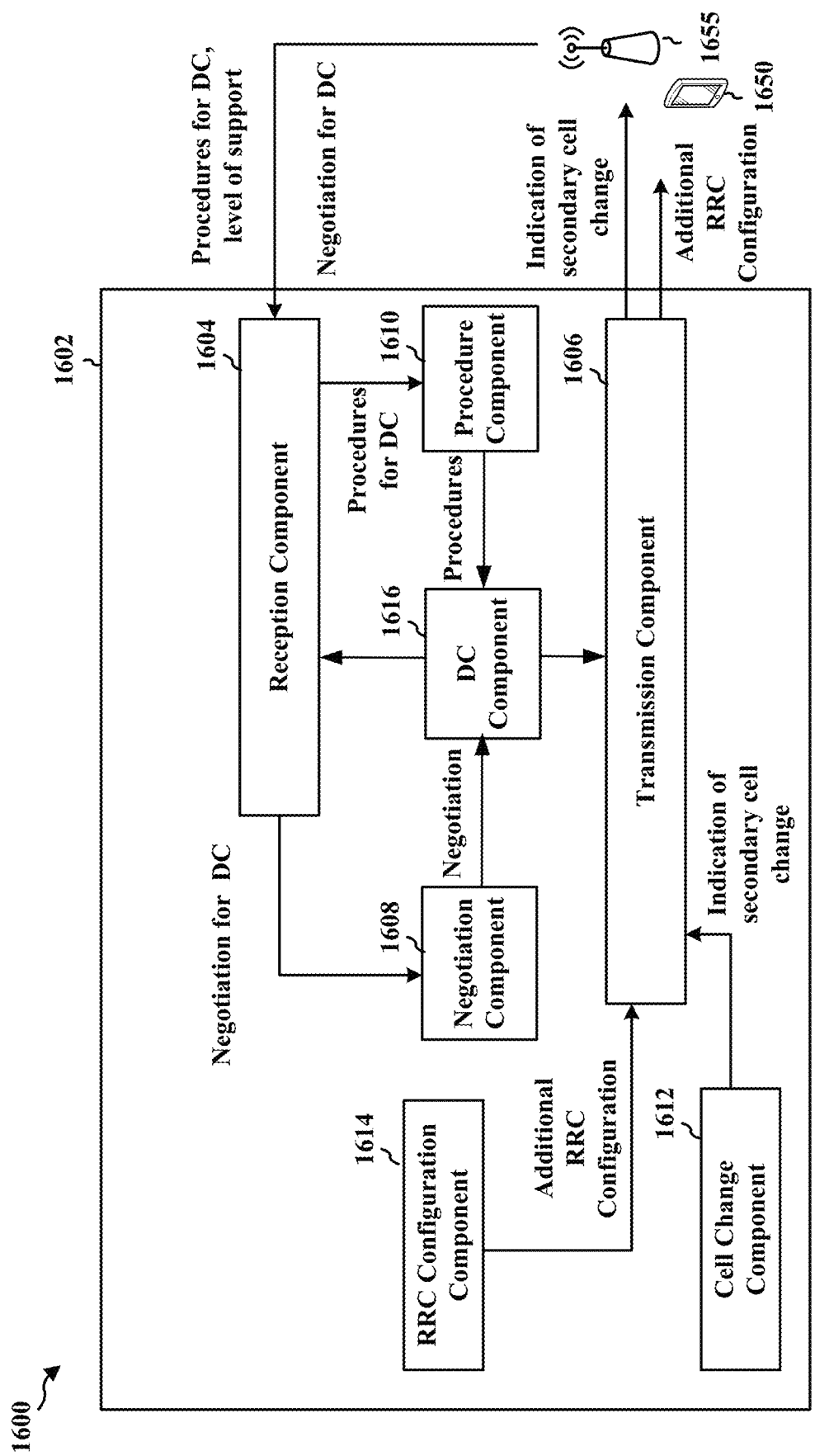
FIG. 16 is a conceptual data flow diagram illustrating the data flow between different means/components in an exemplary apparatus.

FIG. 16 is a conceptual data flow diagram 1600 illustrating the data flow between different means/components in an exemplary apparatus 1602. The apparatus may be a base station, such as a base station capable of standalone operation in a first RAT utilizing an unlicensed frequency spectrum (e.g., base station 190, 350, 506, 606, 704, 706, 708, 710, 806) configured as a secondary node (e.g., SeNB) for dual connectivity with a second base station 1655 using a second RAT in the licensed frequency spectrum (e.g., LTE base station, another 3GPP base station, or a 5G NR base station, e.g., base station 102, 310, 504, 604, 714, 804). The apparatus includes a reception component 1604 that receives communication from UE 1650 and other licensed base stations 1655 and a transmission component 1606 that transmits to UE 1650/base station 1655. The apparatus includes a negotiation component 1608 configured to receive, from a second base station, negotiation for dual connectivity communication with a user equipment, e.g., as described in connection with 1102. The apparatus may include a procedure component 1610 configured to receive an indication of a set of procedures for dual connectivity communication with the second base station as the master base station and the first base station as a secondary base station, e.g., as described in connection with 1104. The apparatus may include a cell change component 1612 configured to transmit, to the second base station, an indication of a secondary cell change to a third base station of the first RAT, e.g., as described in connection with 1106. The apparatus may include an RRC configuration component 1614 configured to transmit an additional RRC configuration to the user equipment in addition to an RRC configuration from the second base station, e.g., as described in connection with 1108. The apparatus may further comprise a DC component 1616 that receives information from the procedure component 1610 and the negotiation component and operates in dual connectivity, e.g. LTE-MF dual connectivity, etc., in connection with reception component and transmission component The apparatus may include additional components that perform each of the blocks of the algorithm in the aforementioned flowcharts of FIGS. 5-8 and 11. As such, each block in the aforementioned flowcharts of FIGS. 5-8 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
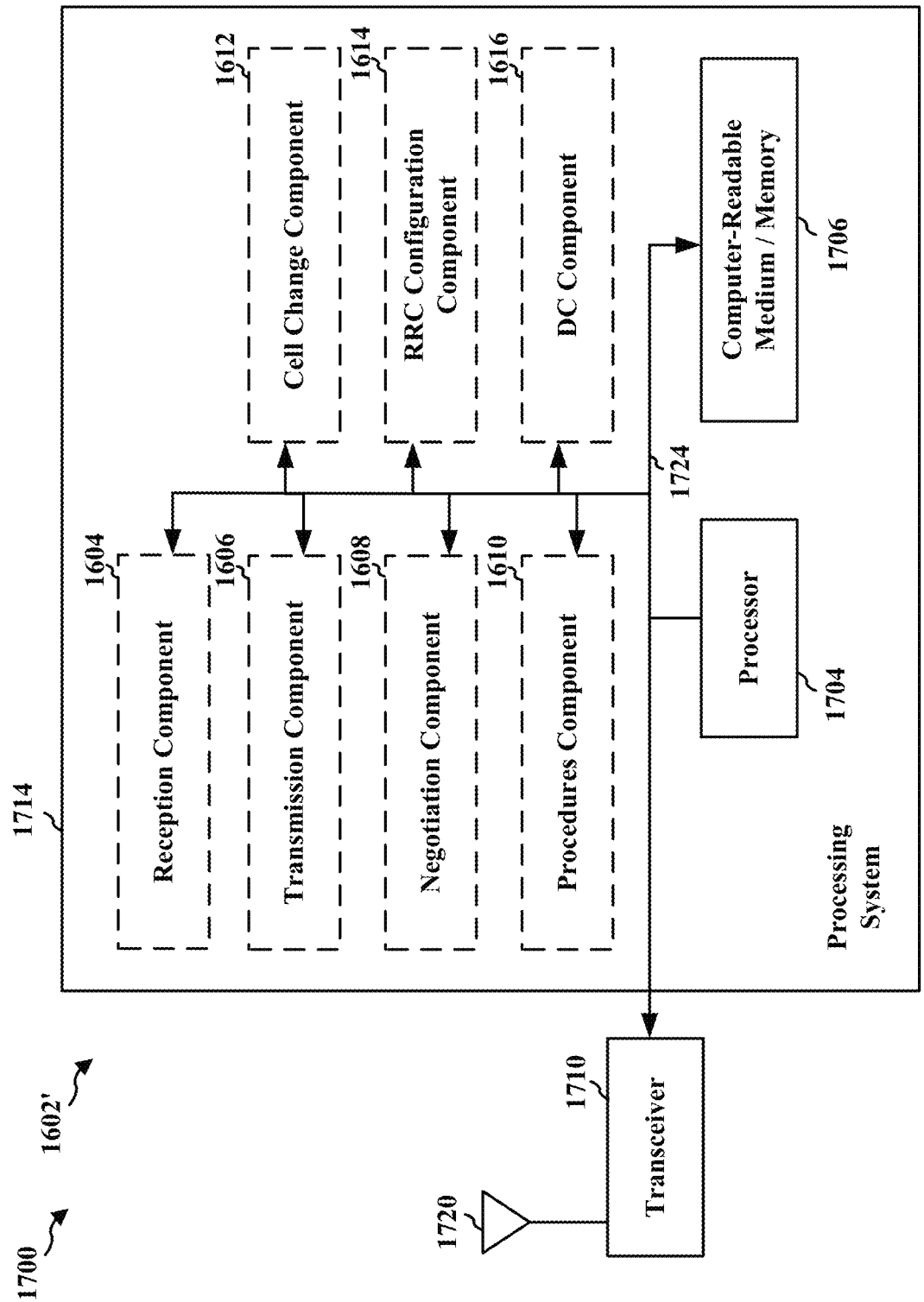
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610, 1612, 1614, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1606, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608, 1610, 1612, 1614. The components may be software components running in the processor 1704, resident/stored in the computer readable medium/memory 1706, one or more hardware components coupled to the processor 1704, or some combination thereof. The processing system 1714 may be a component of the base station 310 and may include the memory 376 and/or at least one of the TX processor 316, the RX processor 370, and the controller/processor 375.

In one configuration, an apparatus for wireless communication includes means for receiving, at a first base station capable of operating in a standalone mode in a first RAT utilizing an unlicensed frequency spectrum, negotiation for dual connectivity communication with a user equipment and a second base station of a second RAT utilizing the licensed frequency spectrum, means for receiving an indication of a set of procedures for dual connectivity communication with the second base station as the master base station and the first base station as a secondary base station, means for transmitting, to the second base station, an indication of a secondary cell change to a third base station of the first RAT, and means for transmitting an additional RRC configuration to the user equipment in addition to an RRC configuration from the second base station. The aforementioned means may be one or more of the aforementioned components of the apparatus and/or the processing system of the apparatus configured to perform the functions recited by the aforementioned means. As described supra, the processing system may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a first base station, comprising:
   receiving, from a user equipment, an indication of a capability for standalone operation in a first Radio Access Technology (RAT) that utilizes an unlicensed frequency spectrum and a dual connectivity capability involving the first RAT and a second RAT that utilizes a licensed frequency spectrum, wherein dual connectivity comprises the user equipment being connected to a master base station on a first frequency and a secondary base station on a second frequency at a same time; and signaling, to the user equipment, an indication of a set of procedures for dual connectivity communication with the master base station and the secondary base station, wherein the set of procedures corresponds to a level of support for the first RAT at the first base station, and wherein the first base station signals a first set of procedures for the dual connectivity communication when the level of support at the first base station is at higher layers of the first RAT and the first base station signals a second set of procedures for the dual connectivity communication when the level of support at the first base station extends to lower layers of the first RAT.

2. The method of claim 1, wherein the second set of procedures comprises a joint power headroom report for both the master base station and the secondary base station and the first set of procedures comprises an independent power headroom report for the master base station and the secondary base station.

3. The method of claim 1, wherein the second set of procedures comprises a first radio resource control (RRC) configuration indicating a power split between the master base station and the secondary base station, and the first set of procedures comprises a second RRC configuration without the power split between the master base station and the secondary base station.

4. The method of claim 1, wherein the second set of procedures comprises buffer status reporting based on split bearers between the master base station and the secondary base station, and the first set of procedures comprises independent buffer status reporting for the master base station and the secondary base station.

5. The method of claim 1, further comprising:
transmitting an indication to the user equipment regarding the level of support for the first RAT at the first base station.

6. The method of claim 1, wherein the first base station comprises an Long Term Evolution (LTE) base station or a 5G New Radio (NR) base station.

7. The method of claim 1, further comprising:
transmitting a list of service providers that provide access to the first RAT to the user equipment for cell searching.

8. The method of claim 1, further comprising:
configuring a measurement object for at least one of a frequency band, a frequency sub-band, or a group of frequencies; and
receiving a measurement report from the user equipment along with an indication of a corresponding frequency for each cell in the measurement report, wherein the measurement report comprises an indication of a RAT corresponding to the measurement report.

9. A method of wireless communication at a first base station, comprising:
receiving, from a user equipment, an indication of a capability for standalone operation in a first Radio Access Technology (RAT) that utilizes an unlicensed frequency spectrum and a dual connectivity capability involving the first RAT and a second RAT that utilizes a licensed frequency spectrum, wherein dual connectivity comprises the user equipment being connected to a master base station on a first frequency and a secondary base station on a second frequency at a same time; and signaling, to the user equipment, an indication of a set of procedures for dual connectivity communication with the master base station and the secondary base station, wherein the set of procedures corresponds to a level of support for the first RAT at the first base station;

transmitting a list of service providers that provide access to the first RAT to the user equipment for cell searching, wherein the list of service providers comprises a public land mobile network identifier (PLMN ID) and a Participating Service Provider identifier (PSP ID) for at least one service provider in the first RAT, the method further comprising:
receiving a response from the user equipment comprising a PLMN ID and a PSP ID for at least one detected service provider from the list of service providers; and
negotiating the dual connectivity communication with a selected service provider from the at least one detected service provider.

10. The method of claim 9, further comprising:
configuring the user equipment for the dual connectivity communication with the selected service provider based on the negotiating.

11. The method of claim 9, further comprising:
determining whether cell selection criteria for the at least one detected service provider is met for the user equipment,
wherein the selected service provider is a service provider for which the cell selection criteria is determined to be met.

12. An apparatus for wireless communication at a first base station, comprising:
a memory; and
at least one processor coupled to the memory and configured to cause the apparatus to:
receive, from a user equipment, an indication of a capability for standalone operation in a first Radio Access Technology (RAT) that utilizes an unlicensed frequency spectrum and a dual connectivity capability involving the first RAT and a second RAT that utilizes a licensed frequency spectrum, wherein dual connectivity comprises the user equipment being connected to a master base station on a first frequency and a secondary base station on a second frequency at a same time; and
signal, to the user equipment, an indication of a set of procedures for dual connectivity communication with the master base station and the secondary base station, wherein the set of procedures corresponds to a level of support for the first RAT at the first base station, wherein the first base station signals a first set of procedures for the dual connectivity communication when the level of support at the first base station is at higher layers of the first RAT and the first base station signals a second set of procedures for the dual connectivity communication when the level of support at the first base station extends to lower layers of the first RAT.

13. A method of wireless communication at a user equipment, comprising:
transmitting, to a first base station using a first Radio Access Technology (RAT) in a licensed frequency spectrum, an indication of a capability for standalone operation in a second RAT that utilizes an unlicensed frequency spectrum and a dual connectivity capability involving the first RAT and the second RAT, wherein dual connectivity comprises the user equipment being connected to the first base station as a master base station on a first frequency and to a second base station using the second RAT as a secondary base station on a second frequency at a same time; and receiving an indication from the first base station of a set of procedures for dual connectivity communication with the master base station and the secondary base station, wherein the set of procedures corresponds to a level of support for the second RAT at the first base station, and wherein the indication from the first base station signals a first set of procedures for the dual connectivity communication when the level of support at the first base station is at higher layers of the second RAT and the first base station signals a second set of procedures for the dual connectivity communication when the level of support at the first base station extends to lower layers of the second RAT.

14. The method of claim 13, wherein the second set of procedures comprises a joint power headroom report for both the master base station and the secondary base station and the first set of procedures comprises an independent power headroom report for the master base station and the secondary base station.

15. The method of claim 13, wherein the second set of procedures comprises a first radio resource control (RRC) configuration indicating a power split between the master base station and the secondary base station, and the first set of procedures comprises a second RRC configuration without the power split between the master base station and the secondary base station.

16. The method of claim 13, wherein the second set of procedures comprises buffer status reporting based on split bearers between the master base station and the secondary base station, and the first set of procedures comprises independent buffer status reporting for the master base station and the secondary base station.

17. The method of claim 13, further comprising:
transmitting a Random Access Channel (RACH) communication to establish an uplink timing of the second base station;
receiving a response from the second base station; and
indicating, to the second base station, the dual connectivity communication with the first base station is a connection setup cause.

18. The method of claim 13, further comprising:
receiving contention-free Random Access Channel (RACH) resources for the second base station from the first base station, wherein multiple contention-free RACH resources are received to account for RACH listen-before-talk (LBT) failure; and
using the contention-free RACH resources for uplink RACH communication with the second base station.

19. The method of claim 13, further comprising:
receiving a configuration of a measurement object from the first base station for at least one of a frequency band, a frequency sub-band, or a group of frequencies; and
transmitting a measurement report from the user equipment along with an indication of a corresponding frequency for each cell in the measurement report, wherein the measurement report comprises an indication of a RAT corresponding to the measurement report.

20. The method of claim 13, further comprising:
receiving a Radio Resource Control (RRC) configuration from the first base station for the second base station as the secondary base station in the dual connectivity communication; and receiving an additional RRC configuration from the second base station, wherein the additional RRC configuration comprises a change to the RRC configuration received from the first base station that does not involve establishment of a new Signaling Radio Bearer (SRB) or Data Radio Bearer (DRB).

21. A method of wireless communication at a user equipment, comprising:
transmitting, to a first base station using a first Radio Access Technology (RAT) in a licensed frequency spectrum, an indication of a capability for standalone operation in a second RAT that utilizes an unlicensed frequency spectrum and a dual connectivity capability involving the first RAT and the second RAT, wherein dual connectivity comprises the user equipment being connected to the first base station as a master base station on a first frequency and to a second base station using the second RAT as a secondary base station on a second frequency at a same time;
receiving an indication from the first base station of a set of procedures for dual connectivity communication with the master base station and the secondary base station, wherein the set of procedures corresponds to a level of support for the second RAT at the first base station;
receiving a list of service providers that provide access to the second RAT for cell searching;
searching for service providers based on the list of service providers;
when a service provider from the list of service providers is detected, determining whether cell selection criteria is met based on signaling from the service provider detected by the user equipment;
when the cell selection criteria is met, reporting the service provider detected by the user equipment to the first base station and receiving a configuration of the secondary base station based on the reporting the service provider to the first base station; and
when the cell selection criteria is not met, refraining from reporting the service provider detected by the user equipment to the first base station.

22. The method of claim 21, wherein the list of service providers comprises at least one of a public land mobile network identifier (PLMN ID) or a Participating Service Provider identifier (PSP ID) for at least one service provider, the method further comprising:
searching for service providers based on the list of service providers;
reporting at least one detected service provider to the first base station, including a corresponding PLMN ID and PSP ID; and
receiving the configuration of the secondary base station based on the reporting the at least one detected service provider.

23. An apparatus for wireless communication at a user equipment, comprising:
a memory; and
at least one processor coupled to the memory and configured to cause the apparatus to:
transmit, to a first base station using a first Radio Access Technology (RAT) in a licensed frequency spectrum, an indication of a capability for standalone operation in a second RAT that utilizes an unlicensed frequency spectrum and a dual connectivity capability involving the first RAT and the second RAT, wherein dual connectivity comprises the user equipment being connected to the first base station as a master base station on a first frequency and to a second base station using the second RAT as a secondary base station on a second frequency at a same time; and receive an indication from the first base station of a set of procedures for dual connectivity communication with the master base station and the secondary base station, wherein the set of procedures corresponds to a level of support for the second RAT at the first base station, and wherein the indication from the first base station signals a first set of procedures for the dual connectivity communication when the level of support at the first base station is at higher layers of the second RAT and the indication from the first base station signals a second set of procedures for the dual connectivity communication when the level of support at the first base station extends to lower layers of the second RAT.

24. The apparatus of claim 23, wherein the second set of procedures comprises a joint power headroom report for both the master base station and the secondary base station and the first set of procedures comprises an independent power headroom report for the master base station and the secondary base station.

25. The apparatus of claim 23, wherein the second set of procedures comprises a first radio resource control (RRC) configuration indicating a power split between the master base station and the secondary base station, and the first set of procedures comprises a second RRC configuration without the power split between the master base station and the secondary base station.

26. The apparatus of claim 23, wherein the second set of procedures comprises buffer status reporting based on split bearers between the master base station and the secondary base station, and the first set of procedures comprises independent buffer status reporting for the master base station and the secondary base station.

* * * * *